US011875349B2

(12) United States Patent
Gosset et al.

(10) Patent No.: US 11,875,349 B2
(45) Date of Patent: Jan. 16, 2024

(54) SYSTEMS AND METHODS FOR AUTHENTICATING ONLINE USERS WITH AN ACCESS CONTROL SERVER

(71) Applicant: MASTERCARD INTERNATIONAL INCORPORATED, Purchase, NY (US)

(72) Inventors: Julia Sharon Gosset, Tarrytown, NY (US); Robert Albert Ederle, Chesterfield, MO (US); Ranjita Shankar Iyer, Chappaqua, NY (US); Brian Piel, Ballwin, MO (US); Christopher John Merz, Wildwood, MO (US); Felix Johannes Flory, Wildwood, MO (US); Andres Gonzalez, Doral, FL (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/448,572

(22) Filed: Jun. 21, 2019

(65) Prior Publication Data
US 2019/0392448 A1  Dec. 26, 2019

Related U.S. Application Data

(60) Provisional application No. 62/688,528, filed on Jun. 22, 2018, provisional application No. 62/688,532, (Continued)

(51) Int. Cl.
*G06Q 20/40* (2012.01)
*H04L 9/40* (2022.01)
(Continued)

(52) U.S. Cl.
CPC ......... *G06Q 20/4016* (2013.01); *G06Q 20/12* (2013.01); *G06Q 20/3226* (2013.01);
(Continued)

(58) Field of Classification Search
CPC .... G06Q 20/4016; G06Q 20/12; G06Q 20/40; G06Q 20/3226; G06Q 20/405;
(Continued)

(56) References Cited

U.S. PATENT DOCUMENTS 7,290,288 B2  10/2007 Gregg et al.
7,314,167 B1   1/2008 Kiliccote
(Continued)

FOREIGN PATENT DOCUMENTS

AU  2005266964 B2  2/2011
CN     1407426 A   4/2003
(Continued)

OTHER PUBLICATIONS

EP Search Report in EP Application No. 19182075.2, dated Oct. 18, 2019. 11 pages.
(Continued)

*Primary Examiner* — Christine M Behncke
*Assistant Examiner* — Henry H Jung
(74) *Attorney, Agent, or Firm* — Armstrong Teasdale LLP

(57) ABSTRACT

A computer-implemented method for authenticating an online user with an access control server (ACS) is provided. The method includes receiving, at a risk-based authentication enabled (RBA-enabled) directory server, an authentication request message including authentication data, extracting, using the RBA-enabled directory server, the authentication data from the authentication request message, transmitting the extracted authentication data to an RBA engine, generating, using the RBA engine, based at least in part on the extracted authentication data, RBA result data including a risk score, a risk analysis, and at least one reason code, transmitting the RBA result data to the RBA-enabled directory server, embedding, using the RBA-enabled directory server, the RBA result data into the authentication
(Continued)

request message to generate an enhanced authentication request message, and transmitting the enhanced authentication request message to the ACS to enable the ACS to make an authentication decision based on the RBA result data.

14 Claims, 13 Drawing Sheets

Related U.S. Application Data filed on Jun. 22, 2018, provisional application No. 62/688,546, filed on Jun. 22, 2018, provisional application No. 62/688,529, filed on Jun. 22, 2018.

(51) Int. Cl.
  *G06Q 20/32* (2012.01)
  *H04W 12/67* (2021.01)
  *G06Q 20/12* (2012.01)

(52) U.S. Cl.
  CPC ........... *G06Q 20/405* (2013.01); *H04L 63/08* (2013.01); *H04L 63/083* (2013.01); *H04L 63/101* (2013.01); *H04W 12/67* (2021.01)

(58) Field of Classification Search
  CPC .............. G06Q 20/401; G06Q 20/388; H04W 12/00505; H04L 63/083; H04L 63/101; H04L 63/102; H04L 63/08; H04L 63/108; H04L 2463/082; H04L 63/1425; H04L 63/0853
  USPC ................................................ 705/26.41, 44
  See application file for complete search history.

(56) References Cited

U.S. PATENT DOCUMENTS

| | | | |
|---|---|---|---|
| 7,614,078 B1 | 11/2009 | Stieglitz | |
| 7,913,300 B1 | 3/2011 | Flank et al. | |
| 8,020,763 B1 | 9/2011 | Kowalchyk et al. | |
| 8,150,762 B1* | 4/2012 | Reed | G06Q 40/03 705/38 |
| 8,170,953 B1 | 5/2012 | Tullis et al. | |
| 8,256,664 B1 | 9/2012 | Balfanz et al. | |
| 8,271,395 B2 | 9/2012 | Dominguez et al. | |
| 8,423,466 B2 | 4/2013 | Lanc | |
| 9,160,742 B1 | 10/2015 | Ackerman | |
| 9,330,416 B1 | 5/2016 | Zaslavsky et al. | |
| 9,390,445 B2* | 7/2016 | Sheets | G06Q 20/4016 |
| 9,779,236 B2 | 10/2017 | Abrams | |
| 10,366,378 B1 | 7/2019 | Han et al. | |
| 10,515,366 B1 | 12/2019 | Gorelik | |
| 10,614,452 B2* | 4/2020 | Tomasofsky | G06Q 20/409 |
| 10,867,303 B1 | 12/2020 | Manapat et al. | |
| 2002/0194138 A1 | 12/2002 | Dominguez et al. | |
| 2004/0054622 A1 | 3/2004 | Strayer et al. | |
| 2004/0199456 A1 | 10/2004 | Flint et al. | |
| 2004/0199462 A1 | 10/2004 | Starrs | |
| 2004/0249767 A1 | 12/2004 | Perrin | |
| 2005/0097320 A1 | 5/2005 | Golan et al. | |
| 2006/0179007 A1 | 8/2006 | Davis | |
| 2006/0277185 A1 | 12/2006 | Sato et al. | |
| 2008/0034092 A1 | 2/2008 | Kikuchi et al. | |
| 2008/0288299 A1 | 11/2008 | Schultz | |
| 2009/0144213 A1 | 6/2009 | Patil | |
| 2010/0057622 A1* | 3/2010 | Faith | G06Q 20/3829 705/38 |
| 2010/0114776 A1 | 5/2010 | Weller et al. | |
| 2011/0023857 A1 | 2/2011 | Grace | |
| 2011/0196791 A1* | 8/2011 | Dominguez | G06Q 40/00 705/44 |
| 2011/0218879 A1* | 9/2011 | Roche | G06Q 20/4016 705/26.41 |
| 2011/0270756 A1 | 11/2011 | Tullis et al. | |
| 2012/0101930 A1 | 4/2012 | Li et al. | |
| 2012/0144461 A1 | 6/2012 | Rathbun | |
| 2012/0197802 A1 | 8/2012 | Smith et al. | |
| 2013/0197998 A1 | 8/2013 | Buhrmann et al. | |
| 2013/0218769 A1 | 8/2013 | Pourfallah et al. | |
| 2014/0279477 A1* | 9/2014 | Sheets | G06Q 20/36 705/41 |
| 2015/0019410 A1 | 1/2015 | Canis | |
| 2015/0120560 A1* | 4/2015 | Fisher | G06Q 20/34 705/44 |
| 2015/0161608 A1 | 6/2015 | Gilbert et al. | |
| 2015/0206146 A1 | 7/2015 | Siddens | |
| 2015/0269578 A1 | 9/2015 | Subramanian et al. | |
| 2015/0339477 A1 | 11/2015 | Abrams et al. | |
| 2016/0034900 A1* | 2/2016 | Nelsen | G06Q 20/4016 705/44 |
| 2016/0078436 A1 | 3/2016 | Tomasofsky et al. | |
| 2016/0078443 A1 | 3/2016 | Tomasofsky et al. | |
| 2016/0078444 A1 | 3/2016 | Tomasofsky et al. | |
| 2016/0104163 A1 | 4/2016 | Aquino et al. | |
| 2016/0140558 A1 | 5/2016 | Groarke et al. | |
| 2016/0203490 A1 | 7/2016 | Gupta et al. | |
| 2016/0210633 A1 | 7/2016 | Epelman et al. | |
| 2016/0239771 A1 | 8/2016 | Gukal et al. | |
| 2016/0260100 A1 | 9/2016 | Wiesman | |
| 2016/0364728 A1* | 12/2016 | DeLawter | G06F 21/6218 |
| 2016/0379216 A1 | 12/2016 | Wang et al. | |
| 2017/0046701 A1* | 2/2017 | Hey | G06Q 20/405 |
| 2017/0076288 A1 | 3/2017 | Awasthi | |
| 2017/0109752 A1 | 4/2017 | Hubbard et al. | |
| 2017/0228635 A1* | 8/2017 | Diev | G06N 3/02 |
| 2017/0344964 A1 | 11/2017 | Garlick et al. | |
| 2018/0089665 A1 | 3/2018 | Wright | |
| 2018/0108012 A1 | 4/2018 | Kohli | |
| 2018/0232694 A1 | 8/2018 | Boding et al. | |
| 2018/0374152 A1 | 12/2018 | Dominguez | |
| 2019/0188715 A1 | 6/2019 | Hey et al. | |
| 2019/0392440 A1 | 12/2019 | Ederle et al. | |
| 2019/0392449 A1 | 12/2019 | Gosset et al. | |
| 2019/0392450 A1 | 12/2019 | Gosset et al. | |
| 2021/0090074 A1 | 3/2021 | Powell | |
| 2022/0122087 A1 | 4/2022 | Gosset | |

FOREIGN PATENT DOCUMENTS

| | | |
|---|---|---|
| CN | 105814592 A | 7/2016 |
| CN | 106575400 A | 4/2017 |
| CN | 107533705 A | 1/2018 |
| CN | 108140190 A | 6/2018 |
| JP | 2017021816 A | 1/2017 |
| WO | 2005004026 A1 | 1/2005 |
| WO | 2017035460 A1 | 3/2017 |

OTHER PUBLICATIONS

IN First Examination Report; App. No. 201914024764, dated Jun. 10, 2021; 7 pages.
IN First Examination Report; App. No. 201914024865, dated Mar. 23, 2021; 5 pages.
IN First Examination Report; App. No. 201914024867, dated Feb. 24, 2021; 5 pages.
China First Office Action, Application No. 201910548590.4, dated Sep. 30, 2022, 29 pps.: with English translation.
China First Office Action, Application No. 201910549310.1, dated Sep. 30, 2022, 20 pps.: with English translation.
China First Office Action, Application No. 201910548622.0, dated Sep. 28, 2022, 16 pps.: with English translation.
China First Office Action, Application No. 201910548602.3, dated Sep. 30, 2022, 23 pps.: with English translation.
China Second Office Action, Application No. 201910548622.0, dated Jan. 18, 2023, 9 pps.: with English translation.
China Second Office Action, Application No. 201910548602.3, dated Apr. 29, 2023, 37 pps.: with English translation.
China Second Office Action, Application No. 201910549310.1, dated Apr. 22, 2023, 19 pps.: with English translation.

(56) References Cited

OTHER PUBLICATIONS

Huang Xuan, "Research on Mobile Security and Smart Systems: Fuzzy Logic and Identity Recognition", Xidian University Press, May 31, 2016, pp. 29-31.: with English Abstract.
China Rejection Decision, Application No. 201910549310.1, dated Aug. 5, 2023, 19 pps.: with English translation.
Yao Qian, "A Glimpse of Digital Money", China Finance Publishing House, May 31, 2018, 6 pps.: with English Abstract.
PCT Search Report for Appl. No. PCT/US2022/052201 dated Apr. 13, 2023, 11 pgs.

\* cited by examiner

SYSTEMS AND METHODS FOR AUTHENTICATING ONLINE USERS WITH AN ACCESS CONTROL SERVER

CROSS REFERENCE TO RELATED APPLICATIONS

This application claims priority to U.S. Provisional Patent Application No. 62/688,528, filed Jun. 22, 2018, entitled "SYSTEMS AND METHODS FOR AUTHENTICATING ONLINE USERS," U.S. Provisional Patent Application No. 62/688,529, filed Jun. 22, 2018, entitled "SYSTEMS AND METHODS FOR AUTHENTICATING ONLINE USERS WITH AN ACCESS CONTROL SERVER," U.S. Provisional Patent Application No. 62/688,546, filed Jun. 22, 2018, entitled "SYSTEMS AND METHODS FOR AUTHENTICATING ONLINE USERS IN REGULATED ENVIRONMENTS," and U.S. Provisional Patent Application No. 62/688,532, filed Jun. 22, 2018, entitled "SYSTEMS AND METHODS FOR AUTHENTICATING ONLINE USERS," the entire contents and disclosures of which are hereby incorporated by reference herein in their entirety.

BACKGROUND

The present application relates generally to authenticating online users over an electronic network, and more particularly, to authenticating online users with an access control server using risk-based authentication.

Transactions conducted over electronic payment networks are growing exponentially. For card-not-present transactions (e.g., transactions in which the consumer does not actually provide a payment card to the merchant), fraud is markedly higher. Accordingly, for such transactions, authentication procedures are often implemented to verify that the alleged cardholder is, in fact, the actual or legitimate cardholder.

In at least some known authentication systems, the bank that issued the payment card for the transaction (referred to as the issuer) contracts with an access control server (ACS) for authentication services. Specifically, the ACS analyzes at least some of the data associated with the transaction, determines whether or not it is likely that the alleged cardholder is, in fact, the actual or legitimate cardholder, and reports that determination to the issuer.

However, contracting with an ACS for authentication services may be relatively expensive for an issuer. Further, different issuers may contract with different ACSs. Accordingly, the amount of data that a particular ACS is able to leverage when performing authentication services may be fairly limited, as that ACS may only have access to a relatively small number of transactions. Further, at least some ACSs do not have the capability to perform more sophisticated (and thus more accurate) authentication procedures. In addition, ACSs that are able to provide some level of fraud detection capability may temporarily lose such capability (e.g., due to equipment malfunction), directly impacting their ability to successfully authenticate online users.

Some authentication systems may also implement strong consumer authentication (SCA) (or just "strong authentication") for certain transactions. For example, an issuing bank may insist on authenticating consumers during online transactions (e.g., with a username and password, or by SMS text message). Such tools may help issuers verify identity and authenticate cardholders, but they may also increase friction with the cardholders, which sometimes leads to transactions being abandoned. This can result in losses to the merchant and to the underlying payment card network. Further, some SCA methods such as passwords may be less trustworthy than others, which may lead to increased risk in transactions.

In some markets, regulators may require SCA on digital transactions. For example, the Reserve Bank of India (RBI), India's central bank, requires that all digital transactions are authenticated using SCA. While these regulations have reduced fraud in India, they create considerable friction during the check-out experience. Cardholders get frustrated with having to provide a password or being timed out of the transaction, and merchants are dissatisfied when cardholders abandon transactions due to their frustrations.

Accordingly, it is desirable to have a computer-implemented authentication platform that is capable of performing sophisticated authentication services on behalf of ACSs that are unable to do so.

BRIEF DESCRIPTION

In one aspect, a computer-implemented method for authenticating an online user with an access control server (ACS) is provided. The method includes receiving, at a risk-based authentication enabled (RBA-enabled) directory server, an authentication request message, the authentication request message including authentication data, extracting, using the RBA-enabled directory server, the authentication data from the authentication request message, transmitting the extracted authentication data to an RBA engine, generating, using the RBA engine, based at least in part on the extracted authentication data, RBA result data including a risk score, a risk analysis, and at least one reason code, transmitting the RBA result data to the RBA-enabled directory server, embedding, using the RBA-enabled directory server, the RBA result data into the authentication request message to generate an enhanced authentication request message, and transmitting the enhanced authentication request message to the ACS to enable the ACS to make an authentication decision based on the RBA result data.

In another aspect, an authentication platform for authenticating an online user with an access control server (ACS) is provided. The authentication platform includes a memory device, and at least one processor coupled to the memory device. The at least one processor is configured to receive an authentication request message, the authentication request message including authentication data, extract the authentication data from the authentication request message, generate, based at least in part on the extracted authentication data, risk-based authentication (RBA) result data including a risk score, a risk analysis, and at least one reason code, embed the RBA result data into the authentication request message to generate an enhanced authentication request message, and transmit the enhanced authentication request message to the ACS to enable the ACS to make an authentication decision based on the RBA result data.

In a further aspect, at least one non-transitory computer-readable storage media having computer-executable instructions embodied thereon for authenticating an online user on behalf of an access control server (ACS) is provided. When executed by at least one processor, the computer-executable instructions cause the at least one processor to receive an authentication request message, the authentication request message including authentication data, extract the authentication data from the authentication request message, generate, based at least in part on the extracted authentication data, risk-based authentication (RBA) result data including a risk score, a risk analysis, and at least one reason code, embed the RBA result data into the authentication request message to generate an enhanced authentication request message, and transmit the enhanced authentication request message to the ACS to enable the ACS to make an authentication decision based on the RBA result data.

BRIEF DESCRIPTION OF THE DRAWINGS

FIGS. 1-12 show example embodiments of the methods and systems described herein.

FIG. 1 is a schematic diagram illustrating an example RBA platform in communication with a multi-party payment card system for processing payment transactions in accordance with one embodiment of the present disclosure.

FIG. 2 is an expanded block diagram of an example embodiment of a computer system used in processing payment transactions that includes a server system in accordance with one example embodiment of the present disclosure.

FIG. 3 illustrates an example configuration of a server system such as the server system shown in FIG. 2.

FIG. 4 illustrates an example configuration of a client system shown in FIG. 2.

FIG. 5 is a schematic diagram illustrating transaction flow in an example authentication system.

FIG. 6 is a schematic diagram illustrating transaction flow in another example authentication system.

FIG. 7 is a flow diagram of an example method for authenticating a user on behalf of an access control server (ACS).

FIG. 8 is a data flow diagram of another example method for authenticating an online user.

FIG. 9 is a flow diagram of another example method for authenticating an online user.

FIG. 10 is a flow diagram of a further example method for authenticating an online user.

FIG. 12 is a flow diagram of a further example advanced authentication process for authenticating an online user and for increasing approvals, reducing fraud, and improving consumer experience.

Figure 1:
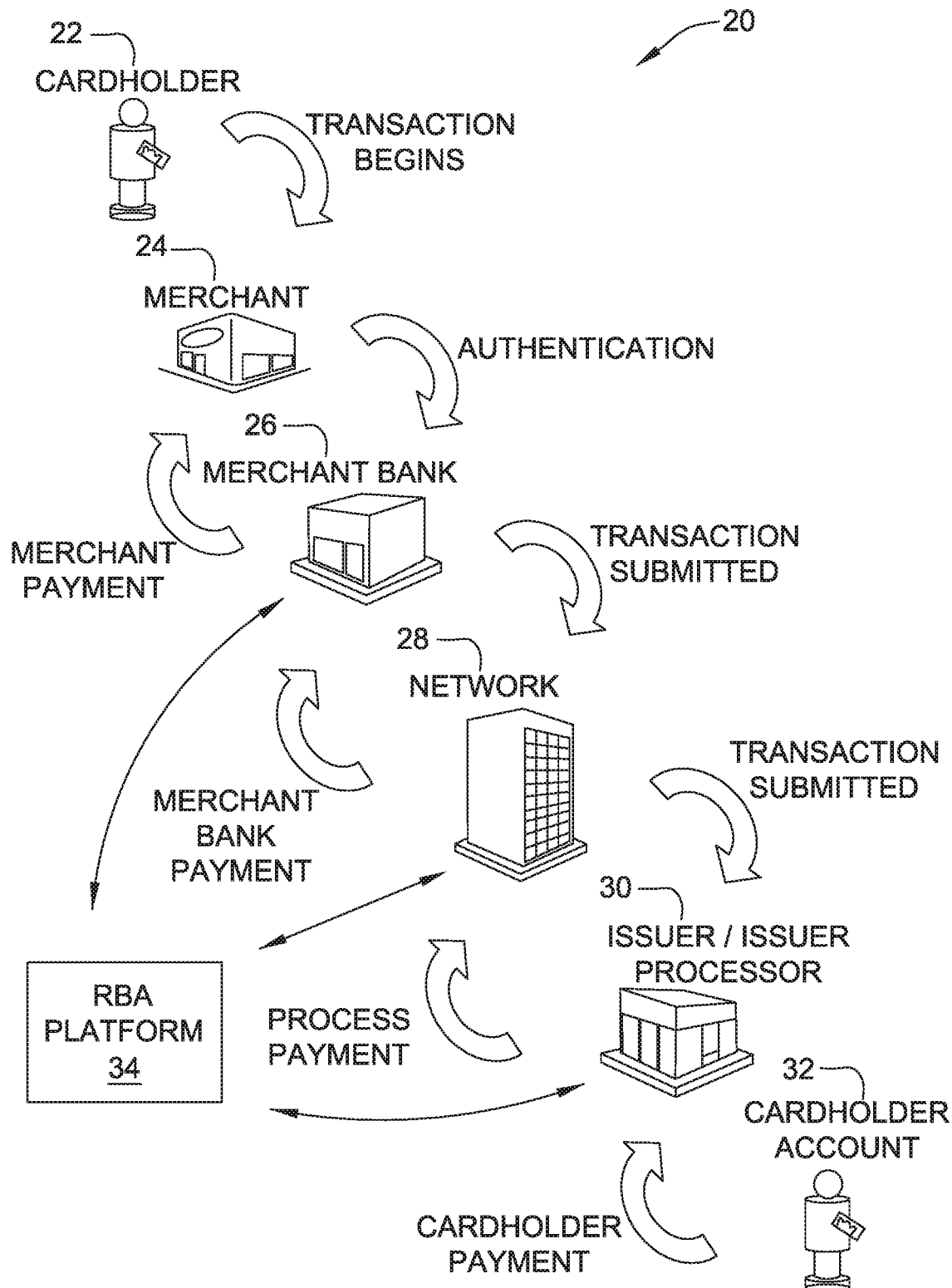

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to authenticating an online user on behalf of an access control server (ACS). A risk-based authentication enabled (RBA-enabled) directory server receives an authentication request message, the authentication request message includes authentication data. The RBA-enabled directory server extracts the authentication data from the authentication request message, and transmits the extracted authentication data to an RBA engine. The RBA engine then generates, based at least in part on the extracted authentication data, RBA result data including a risk score, a risk analysis, and at least one reason code, and transmits the RBA result data to the RBA-enabled directory server. The RBA-enabled directory server embeds the RBA result data into the authentication request message to generate an enhanced authentication request message, and transmits the enhanced authentication request message to the ACS to enable the ACS to make an authentication decision based on the RBA result data.

As noted above, in at least some known authentication systems, a bank that issued a payment card for a transaction (referred to as the issuer) contracts with an ACS for authentication services. Specifically, the ACS analyzes at least some of the data associated with the transaction, determines whether or not it is likely that the alleged cardholder is, in fact, the actual or legitimate cardholder, and reports that determination to the issuer.

However, in at least some known authentication systems, contracting with an ACS for authentication services may be relatively expensive for an issuer. Further, different issuers may contract with different ACSs. Accordingly, the amount of data that a particular ACS is able to leverage when performing authentication services may be fairly limited, as that ACS may only have access to a relatively small number of transactions. Further, at least some ACSs do not have the capability to perform more sophisticated (and thus more accurate) authentication procedures. In addition, ACSs that are able to provide some level of fraud detection capability may temporarily lose those capabilities (e.g., due to equipment malfunction), directly impacting their ability to successfully authenticate online users.

Further, at least some ACSs rely on their associated issuers for updated and accurate fraud information. Accordingly, those ACSs can only improve their fraud detection and authentication procedures if they receive the necessary data from those issuers. Also, at least some ACSs do not have sufficient resources to develop more sophisticated authentication procedures, and accordingly, are unable to compete with more sophisticated entities.

Accordingly, to address these limitations of known authentication systems, the systems and methods described herein allow an ACS to realize the benefits of RBA procedures, even if the ACS lacks the capability to perform more sophisticated authentication procedures, such as RBA. As described herein, RBA refers to performing authentication on transactions using a rich, comprehensive data set that is generally not available to an issuer or ACS. For example, as described herein, RBA may include performing authentication using the 3DS 2 Protocol (for example versions 2.0, 2.1, 2.2, and subsequent versions of the 3DS Protocol). The 3DS Protocols are owned and updated by EMVCo. Further, as described herein, RBA may be performed by an authentication platform that is operated by a payment processing network. Thus, for authentication purposes, the authentication platform is capable of leveraging large volumes of historical transaction data for all transactions previously processed by the payment processing network (as compared to the relatively small number of transactions processed by a particular ACS).

Specifically, in the systems and methods described herein, the authentication system uses the 3DS 2 Protocol (or subsequent versions of the 3DS Protocol) for authentication, and performs RBA on behalf of ACS providers that are unable to perform RBA. An RBA-enabled directory server is communicatively coupled to a RBA engine (which may be collectively referred to as an authentication platform). The RBA-enabled directory server and the RBA engine facilitate performing RBA behalf of ACS providers, as described herein. The RBA-enabled directory server and the RBA engine may be operated, for example, by an interchange network (e.g., a payment processing network).

The RBA-enabled directory server receives an authentication request (AReq) message from a 3DS server. However, instead of immediately forwarding the AReq message to an ACS, the RBA-enabled directory server transmits at least some of the data in the AReq message (e.g., authentication data) to the RBA engine.

In the example embodiment, the RBA engine analyzes the data in the AReq message to generate RBA result data. For example, the RBA engine may compare the data in the AReq message to one or more long term variables ("LTV"). The one or more LTV may include historical authentication data associated with the payment account number (PAN) at issue, historical authorization data associated with the PAN, other historical data associated with the PAN, etc. The LTV may be associated with both card present and card not present historical transactions. For example, the LTV may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the LTV may be stored in a database accessible by the RBA engine and operated by the interchange network. In some embodiments, the LTV data will be hashed prior to storing to protect the security of this personally identifiable information.

In addition, the data in the AReq message may also be compared to other parameters. For example, to monitor consistency and changes in behavior, the data may be compared to short term variables (e.g., on the order of minutes, hours, or days), including velocities and ratios of PAN authorization and authentication. This may include comparing to recent transaction frequency, amount spent, declines, historical risk scores, etc. Alternatively, the data in the AReq message may be analyzed using any suitable techniques to generate RBA result data, as described herein.

In the example embodiment, the RBA result data generated by the RBA engine includes a risk score, a risk analysis, and at least one reason code. The risk score is a score representing a determined riskiness of the transaction, with lower scores indicating lower risk and higher scores indicating higher risk. In other words, the risk score represents a likelihood that the suspect cardholder (e.g., the person attempting to perform a transaction) is the legitimate cardholder having the privileges to use the payment card to perform a payment transaction. For example, the risk score may be represented by a number from 0-999 and/or by a risk threshold category from 0-19. In some embodiments, risks assessments that will be shared, such as through the authorization field of one or more messages will be quantified on a scale of 0-9. Those of skill in the art will appreciate that any suitable risk score may be used.

The risk analysis is a description of a level of risk corresponding to the risk score (e.g., low risk, medium risk, or high risk). Further the reason codes include one or more factors that influenced the risk score. In some embodiments, the reason codes are generated using reason code categories and anchors, as described herein. In some embodiments, the reason codes are affected by rules and/or a combination of the rules and the model. The RBA engine transmits the RBA result data to the RBA-enabled directory server.

The RBA-enabled directory server embeds the RBA result data into the AReq message to generate an enhanced or enriched AReq message. For example, in some embodiments, the RBA result data is appended to the AReq message as an extensible markup language (XML) extension of the AReq message. For example, the extension may have the following format:

```
"name": "ACS RBA",
"id": "A000000004-acsRBA",
"criticalityIndicator": "true",
"data": {
    "status":"success",
    "score":"150",
    "decision":"low risk",
    "reasonCode1":"Y",
    "reasonCode2":"J"}
``` where "score" is the risk score, "decision" is the risk analysis, and "reasonCode1" and "reasonCode2" are the reason codes. In the exemplary embodiment, the reason codes are transmitted as a single letter each. In other embodiments, the reason codes may be represented in different methods. In some embodiments, reasonCode2 is transmitted by the merchant to provide the merchant's assessment of the transaction. Alternatively, the RBA result data may be embedded into the AReq message to generate an enhanced or enriched AReq message using any suitable process.

The enhanced AReq message is then transmitted from the RBA-enabled directory server to the ACS. The ACS then analyzes the RBA result data in the enhanced AReq message to make an authentication decision. That is, in the example embodiment, the ACS may determine to fully authenticate the transaction, deny authentication for the transaction, or perform additional authentication (e.g., by issuing a step-up challenge to the cardholder) for the transaction, based on at least one of a risk score, the risk analysis, and the reason codes. Accordingly, the ACS does not perform the RBA analysis, but is still able to leverage the results of that analysis to make an authentication decision (e.g., by using the results in their own fraud analysis platform), generally resulting in more approvals with less fraud. Thus, the RBA-enabled directory server and the RBA engine perform the RBA analysis on behalf of the ACS. In some embodiments, the ACS receives authentication data from a plurality of sources.

The 3DS 2 Protocol (and subsequent versions of the 3DS Protocol) provides a number of benefits to cardholders, issuers, and merchants. It reduces risk of unauthorized transactions through an approach that incorporates a rich, comprehensive set of data to make authentication decisions. For cardholders, it provides a simple, secure, and familiar online authentication experience, regardless of payment channel or device. For issuers, it allows for "frictionless" authentication, in which an explicit cardholder step-up authentication is not required or performed. This enables more intelligent risk assessment decisions and the ability to selectively challenge the cardholder as needed. This also improves cardholder experience and overall cardholder loyalty to issuers. For merchants, the 3DS 2 Protocol decreases fraud on all authenticated transactions, and increases revenue potential from reduced friction and reduced cart abandonment (i.e., cardholders deciding not to complete a transaction after they have already selected one or more items to be purchased), especially for mobile payment channels. This also improves cardholder experience and overall cardholder loyalty to merchants. The 3DS 2 Protocol and RBA may support additional payment channels, such as, but not limited to, card-on-file, wallet, mobile, in-app, and Internet of Things (IoT).

Using 3DS 2 Protocol (or subsequent versions of the 3DS Protocol), payment networks see 100% of all authentication requests globally on all cards on their brands. No other party, including issuers and ACS providers, is able to provide this global visibility. This global visibility may be leveraged to provide a consistent, standards-based risk analysis of transactions on behalf of issuers, enabling a market-wide risk-based authentication approach.

As compared to previous authentication methods (e.g., 3DS 1.0), the 3DS 2 Protocol (and subsequent versions of the 3DS Protocol) allows for approximately ten times the amount of transaction data to be gathered, analyzed, and utilized to prevent fraud. The additional data included in the 3DS Protocol increases data exchange between merchants and issuers, and improves risk-based authentication (RBA) decisioning. RBA allows issuers to examine every authentication request through transaction risk analysis, while focusing fraud prevention efforts on transactions that prevent the most risk. Further, RBA utilizes both behavioral and transactional inputs in conjunction with a risk engine to determine riskiness of a transaction. The RBA method of cardholder authentication dynamically calculates a risk assessment for any given e-commerce transaction in real time. The assessment can then be used to authenticate the cardholder in a frictionless manner.

The RBA methodology includes three components that work together to provide authentication of cardholders. First, the underlying data model is used to provide a basis for the authentication. The underlying data model may include 3DS data, which may include cardholder data, behavioral data, location data, merchant data, and device data. The underlying data model may also include interchange network data, such as, but not limited to, past risk scores, authentication approvals, authorization history, chargeback data, and fraud data.

The RBA methodology may use in the underlying data model in one or more measurement methodologies. The measurement methodologies may include short term velocities and ratios, including measuring behavior consistency and changes, such as frequency, amount spent, time, location, and device. The measurement methodologies may also include long term velocities and ratios, which include measurement of behavior and anomaly detection. The measurement methodologies may further include continuous measurement across the payment network.

The RBA methodology may then use the underlying data model and the measurement methodology in a rules engine. The rules engine may include thresholds for interpreting measurement results, rules for combining results of measurements, and rules for combining other data with models and measurements.

Transactions deemed safe or low risk are silently authenticated (i.e., so-called "frictionless" authentication), while higher risk transactions are subjected to step-up authentication. When a low risk transaction is silently authenticated, so much data has already been gathered that further authentication adds little to no value. Accordingly, RBA effectively replaces the need for an explicit interaction with the cardholder for every transaction, but transactions are still fully authenticated, with liability resting with the issuer. Thus, more transactions are completed with minimal cardholder disruption, aiding e-commerce growth.

An example of a safe (or low-risk) transaction may include, where the cardholder has a positive transaction history, is performing the transaction with a known device with a positive association with the cardholder, the cardholder is in a typical geolocation, the device is using a typical IP address, the transaction fits within a typical behavioral and transaction pattern, and the shipping address has been used with the payment account number (PAN) and is the same as the last transaction. The cardholder buys a present to be delivered to his house. An example of a medium risk transaction may include, where the cardholder has a positive transaction history, is using an unknown device with no known association with the cardholder, the device is at a non-typical geolocation and IP address, but is typical behavioral, cardholder, and transaction pattern. For example, the cardholder is on travel and purchases Internet Access at a hotel. An example of a high risk transaction may include, where there are anomalous velocities detected with the cardholder in network, is using an unknown device with no known association with the cardholder, the device is at a non-typical geolocation and IP address, and there is anomalous behavior patterns detected. The cardholder purchases over $600 of clothing in Texas right after the cardholder purchased lunch in St. Louis.

One goal of RBA is to minimize the number of transactions that require active (i.e., step-up) authentication, while keeping fraud to a minimum and improving consumer friction points during the transaction process. The goal of RBA is to silently eliminate unnecessary friction on low risk transactions. Approximately 90% of transactions are deemed low risk and would then be authenticated without any action and would proceed to the Authorization process. This greatly decreases the amount of processing and message traffic necessary to authenticate transactions. 5-8% of transactions would be considered medium risk and the cardholder would be asked to authenticate themselves, such as through a step-up challenge. Then 1-2% of transactions would be deemed high risk and would fail authentication. With RBA, the information gathered enables transaction scoring and classification into low, medium, and high risk, allowing the issuer and ACS to take appropriate action.

The 3DS 2 Protocol (and subsequent versions of the 3DS Protocol) enables a market-wide level risk analysis of all transactions that reach directory server 510. Each transaction can be scored and/or flagged based on the global data available using the 3DS 2 Protocol (and subsequent versions of the 3DS Protocol). Additionally, the payment processor operating the directory server 510 has the ability to see cardholder activity across the digital and physical domains, and can utilize this expanded view to improve scoring. In contrast, traditional authentication service providers may only address the digital domain. For example, a payment processor could indicate if a particular device is associated with fraud, and flag that device for issuers in future transactions. The issuer may then reject transactions involving that device or prompt for additional authentication (e.g., through two-factor authentication).

The following Table 1 lists a number of the data elements that are used in the 3DS 2 Protocol for authentication. For example, at least some of these data elements may be included in the authentication data included in the AReq sent to directory server 510. The eighteen data elements that are also part of the 3DS 1.0 Protocol are bolded in Table 1. Those of skill in the art will appreciate that the number of rich data elements could grow beyond those listed below (e.g., in future versions of the 3DS Protocol), and could include over one hundred and seventy data elements. Further, an app-based transaction (e.g., carried out using a mobile computing device) could provide even more data elements than browser-based transactions. In addition, a transaction performed using an Android device could have over one hundred and thirty additional elements. The authentication data may also be divided by category, such as: transaction data (amount, currency, date, and time), device data (IP address, device info, and channel data), cardholder data (account number and shipping address), and merchant data (name, category, and country).

TABLE 1

| | Data Element |
|---|---|
| 1 | 3DS Requestor Authentication Information |
| 2 | 3DS Requestor Challenge Indicator |
| 3 | 3DS Requestor ID |
| 4 | 3DS Requestor Initiated Indicator |
| 5 | 3DS Requestor Name |
| 6 | 3DS Requestor Non-Payment Authentication Indicator |
| 7 | 3DS Requestor Prior Transaction Authentication Information |
| 8 | 3DS Requestor URL |
| 9 | 3DS Server Operator ID |
| 10 | 3DS Server Reference Number |
| 11 | 3DS Server Transaction ID |
| 12 | 3DS Server URL |
| 13 | Account Type |
| 14 | Acquirer BIN |
| 15 | Acquirer Merchant ID |
| 16 | ACS Challenge Mandated Indicator |
| 17 | ACS Counter ACS to SDK |
| 18 | ACS HTML |
| 19 | ACS Operator ID |
| 20 | ACS Reference Number |
| 21 | ACS Rendering Type |
| 22 | ACS Signed Content |
| 23 | ACS Transaction ID |
| 24 | ACS UI Type |
| 25 | Address Match Indicator |
| 26 | Authentication Method |
| 27 | Authentication Type |
| 28 | Authentication Value |
| 29 | Browser Accept Headers |
| 30 | Browser IP Address |
| 31 | Browser Java Enabled |
| 32 | Browser Language |
| 33 | Browser Screen Color Depth |
| 34 | Browser Screen Height |
| 35 | Browser Screen Width |
| 36 | Browser Time Zone |
| 37 | Browser User-Agent |
| 38 | Card/Token Expiry Date |
| 39 | Cardholder Account Identifier |
| 40 | Cardholder Account Information |
| 41 | Cardholder Account Number |
| 42 | Cardholder Billing Address City |
| 43 | Cardholder Billing Address Country |
| 44 | Cardholder Billing Address Line 1 |
| 45 | Cardholder Billing Address Line 2 |
| 46 | Cardholder Billing Address Line 3 |
| 47 | Cardholder Billing Address Postal Code |
| 48 | Cardholder Billing Address State |
| 49 | Cardholder Email Address |
| 50 | Cardholder Home Phone Number |
| 51 | Cardholder Mobile Phone Number |
| 52 | Cardholder Name |
| 53 | Cardholder Shipping Address City |
| 54 | Cardholder Shipping Address Country |
| 55 | Cardholder Shipping Address Line 1 |
| 56 | Cardholder Shipping Address Line 2 |
| 57 | Cardholder Shipping Address Line 3 |
| 58 | Cardholder Shipping Address Postal Code |
| 59 | Cardholder Shipping Address State |
| 60 | Cardholder Work Phone Number |
| 61 | Challenge Additional Information Text |
| 62 | Challenge Cancelation Indicator |
| 63 | Challenge Data Entry |
| 64 | Challenge HTML Data Entry |
| 65 | Challenge Information Header |
| 66 | Challenge Information Label |
| 67 | Challenge Information Text |
| 68 | Challenge Information Text Indicator |
| 69 | Challenge Selection Information |
| 70 | Challenge Window Size |
| 71 | Device Channel |

TABLE 1-continued

| | Data Element |
|---|---|
| 72 | Device Information |
| 73 | Device Rendering Options Supported |
| 74 | DS Reference Number |
| 75 | DS Transaction ID |
| 76 | DS URL |
| 77 | Electronic Commerce Indicator |
| 78 | EMV Payment Token Indicator |
| 79 | Expandable Information Label 1 |
| 80 | Expandable Information Text 1 |
| 81 | Instalment Payment Data |
| 82 | Interaction Counter |
| 83 | Issuer Image |
| 84 | Merchant Category Code |
| 85 | Merchant Country Code |
| 86 | Merchant Name |
| 87 | Merchant Risk Indicator |
| 88 | Message Category |
| 89 | Message Extension |
| 90 | Message Type |
| 91 | Message Version Number |
| 92 | Notification URL |
| 93 | OOB App Label |
| 94 | OOB App URL |
| 95 | OOB Continuation Indicator |
| 96 | OOB Continuation Label |
| 97 | Payment System Image |
| 98 | Purchase Amount |
| 99 | Purchase Currency |
| 100 | Purchase Currency Exponent |
| 101 | Purchase Date & Time |
| 102 | Recurring Expiry |
| 103 | Recurring Frequency |
| 104 | Resend Challenge Information Code |
| 105 | Resend Information Label |
| 106 | Results Message Status |
| 107 | SDK App ID |
| 108 | SDK Counter SDK to ACS |
| 109 | SDK Encrypted Data |
| 110 | SDK Ephemeral Public Key (Qc) |
| 111 | SDK Reference Number |
| 112 | SDK Transaction ID |
| 113 | Submit Authentication Label |
| 114 | Transaction Status |
| 115 | Transaction Status Reason |
| 116 | Transaction Type |
| 117 | Why Information Label |
| 118 | Why Information Text |

In the example embodiment, transactions are categorized "merchant only" or "fully authenticated." "Fully authenticated" transactions are generally considered to be low risk transactions that have been authenticated. "Merchant only" transactions are more risky transactions. In some embodiments, "merchant only" transactions have been authenticated. In the example embodiment, one or more indicators in the authentication response indicate whether a transaction is "merchant only" or "fully authenticated." One or more indicators may also indicate whether or not authentication was attempted on the transaction. This information is used by the merchant to determine whether or not to begin the authorization process for the transaction. In some embodiments, this information is also stored in a database and is referred to by at least one of the interchange network and the issuer processor during the authorization process.

In some further embodiments, the authentication platform determines whether the authentication request message complies with the 3DS 2 Protocol or subsequent versions of the 3DS Protocol. If the authentication request message does not comply with the appropriate 3DS Protocols, the authentication platform bypasses determining if the ACS is available. In this situation, the authentication platform transmits an authentication response message indicating that the transaction is considered merchant only and that no authentication was attempted.

In some embodiments, the authentication platform determines a risk level based on the RBA result data. If the risk level is low, the authentication platform embeds an indicator in the authentication response message indicating that the transaction is "fully authenticated." If the risk level is not low, the authentication platform embeds one or more indicators in the authentication response message indicating that the transaction is a merchant only transaction and that authentication was attempted.

In the example embodiment, the authentication platform performs the authentication process on the transaction, including RBA. This analysis is based on a machine learning model where, over time, the authentication platform is capable of improving its ability to determine the risk level associated with transactions. The authentication platform analyzes transactions that are authenticated by the ACS and compares these transactions with historical data to generate a risk model for each issuer. By comparing the data points in each transaction, the risk model will indicate the amount of risk associated with each transaction based on the authentication data in the corresponding authentication requests. This allows the authentication platform to analyze transactions when the ACS is unavailable and perform authentication on these transactions to provide a response to the authentication request. Accordingly, the authentication platform may determine that a received authorization request is substantially similar to a previous transaction that the ACS scored at low risk. Thus allowing the authentication platform to determine that the received transaction is low risk with a degree of certainty.

At least one of the technical problems addressed by this system includes: (i) high network load based at least in part on step-up challenging most or all card-not-present transactions which results in network delays and reduced bandwidth; (ii) allowing fraudulent transactions to be successfully processed if there is no step-up challenge of a card-not-present transaction; (iii) consumer inconvenience during card-not-present transactions based at least in part on having to answer an additional authentication challenge during a transaction; (iv) abandonment of transactions by consumers when faced with a step-up challenge, thus leading to lost sales for merchants and lost processing fees for the other network parties based on those abandoned transactions; (v) unavailability of customizable fraud-related services to merchants and/or merchant acquirers; (vi) increased risk with merchant liability for fraudulent transactions; (vii) digital wallet-related fraud; (viii) issuers having limited access to some data that may be used to fraud-score transactions; (ix) reducing the network load by reducing network traffic to and from the ACS; (x) increasing the speed of the authentication process by reducing the number of steps required; and (xi) reducing the processing load of the ACS by pre-filtering authentication requests to prevent redundant or unnecessary processing.

A technical effect of the systems and processes described herein is achieved by performing at least one of the following steps: (i) receiving, at a risk-based authentication enabled (RBA-enabled) directory server, an authentication request message, the authentication request message including authentication data; (ii) extracting, using the RBA-enabled directory server, the authentication data from the authentication request message; (iii) transmitting the extracted authentication data to an RBA engine; (iv) generating, using the RBA engine, based at least in part on the extracted authentication data, RBA result data including a risk score, a risk analysis, and at least one reason code; (v) transmitting the RBA result data to the RBA-enabled directory server; (vi) embedding, using the RBA-enabled directory server, the RBA result data into the authentication request message to generate an enhanced authentication request message; and (vii) transmitting the enhanced authentication request message to the ACS to enable the ACS to make an authentication decision based on the RBA result data.

As will be appreciated, based on the description herein the technical improvement in the authentication system as described herein is a computer-based solution to a technical deficiency or problem that is itself rooted in computer technology (e.g., the problem itself derives from the use of computer technology). More specifically, fraud is significant problem for transactions conducted over an electronic payment network, especially for card-not-present transactions. Advanced fraud detection methodologies (e.g., RBA) exist, but at least some ACSs are unable to execute those methodologies and furthermore communication with ACSs increases network traffic and processing load. Accordingly, to address this problem, the systems and methods described herein address this technical problem by using an RBA-enabled directory server and RBA engine to perform RBA on behalf of an ACS and forward the results of the RBA to the ACS to enable the ACS to make an authentication decision.

The following detailed description of the embodiments of the disclosure refers to the accompanying drawings. The same reference numbers in different drawings may identify the same or similar elements. Also, the following detailed description does not limit the claims.

Described herein are computer systems such as authentication computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is a schematic diagram illustrating an example RBA platform 34 in communication with a multi-party payment card system 20 for processing payment transactions in accordance with one embodiment of the present disclosure. FIG. 1 depicts a flow of data in a financial transaction through system 20. Embodiments described herein may relate to a transaction card system, such as a credit card payment system using the MASTERCARD® interchange network. The MASTERCARD® interchange network is a set of proprietary communications standards promulgated by Mastercard International Incorporated® for the exchange of financial transaction data and the settlement of funds between financial institutions that are members of Mastercard International Incorporated®. (MASTERCARD® is a registered trademark of Mastercard International Incorporated located in Purchase, New York).

In the exemplary transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authentication of the cardholder 22 and authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether the alleged cardholder is actually legitimate cardholder 22 (i.e., authentication), whether cardholder's 22 account 32 is in good standing, and whether the purchase is covered by cardholder's 22 available credit line. Based on these determinations, the requests for authentication and authorization will be declined or accepted. Authentication may be performed prior to authorization. If the requests are accepted, an authorization code is issued to merchant 24.

In the exemplary embodiment, the payment card system 20 includes or is in communication with a risk-based authentication (RBA) server 34. In this embodiment, the RBA platform 34 provides enhanced meta-data collection to capture information, including meta-data from the payment transactions processed by the payment card system 20. The RBA platform 34 stores this meta-data to use to provide as historical data when performing an authentication process prior to performing an authorization process. In the exemplary embodiment, the RBA platform 34 may receive historical data from one or more of the acquirer bank 26, the interchange network 28, and the issuer bank 30. Examples of this data include one or more long term variables ("LTV"). The one or more LTV may include historical authorization data associated with a plurality of PANs, other historical data associated with the plurality of PANs, etc. The LTV may be associated with both card present and card not present historical transactions. For example, the LTV may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the LTV may be stored in a database accessible by RBA platform 34 and operated by an interchange network 28. In some embodiments, the LTV data will be hashed prior to storing to protect the security of this personally identifiable information.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction may be settled between issuer bank 30 and interchange network 28, and then between interchange network 28 and merchant bank 26, and then between merchant bank 26 and merchant 24.

As described below in more detail, risk-based authentication (RBA) may be performed by the RBA platform 34 on behalf of an access control server (ACS) or issuer bank 30 in the context of multi-party payment card system 20. Although the systems described herein are not intended to be limited to facilitate such applications, the systems are described as such for example purposes.

Figure 2:
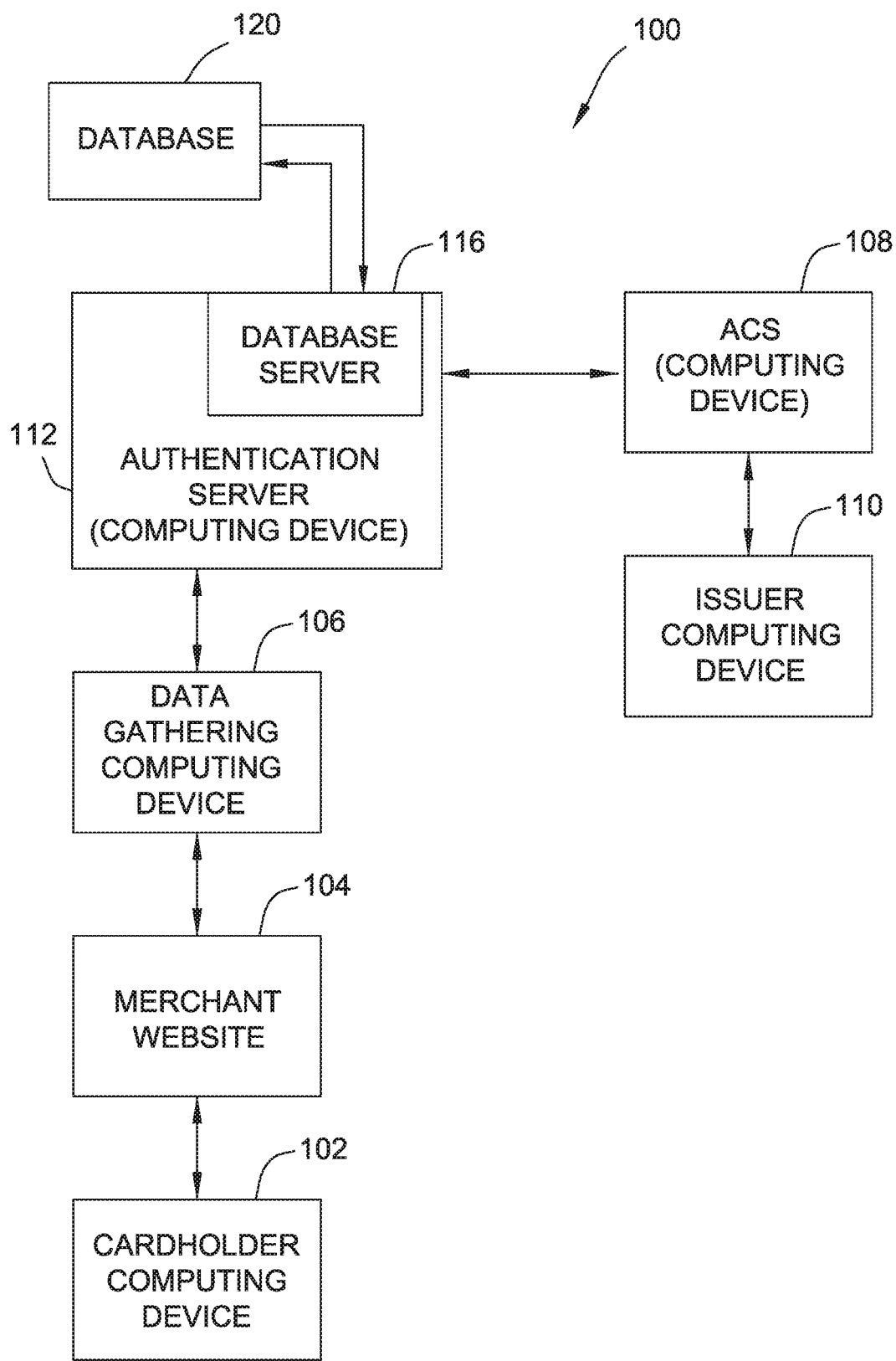

FIG. 2 is an expanded block diagram of an example embodiment of a computer system 100 used in authenticating payment transactions. In the exemplary embodiment, system 100 may be used for authenticating payment transactions either in concert with an ACS or in place of the ACS.

In the exemplary embodiment, cardholder computing devices 102 are computers that include a web browser or a software application, which enables cardholder computing devices 102 to access remote computer devices, such as merchant website 104, using the Internet or other network. More specifically, cardholder computing devices 102 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Cardholder computing devices 102 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, cardholder computing devices 102 are associated with individual cardholders 22 (shown in FIG. 1).

In the exemplary embodiment, merchant website 104 is an online shopping website that is reachable through computers that include a web browser or a software application, such as cardholder computing devices 102, using the Internet or other network. More specifically, merchant website 104 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Computing devices hosting merchant website 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, merchant website 104 is associated with merchant 24 (shown in FIG. 1). In the exemplary embodiment, merchant website 104 allows cardholder 22 to purchase goods and/or services using cardholder computing device 102. In some embodiments, payment transactions performed through merchant website 104 are considered card not present transactions.

In the exemplary embodiment, data gathering computer devices 106 are computers that include a web browser or a software application, which enables data gathering computer devices 106 to access remote computer devices, such as merchant website 104 and authentication server 112, using the Internet or other network. More specifically, data gathering computing devices 106 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Data gathering computer devices 106 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the data gathering computer devices 106 are associated with a 3DS server or service. In other embodiments, data gathering computer devices 106 are associated with acquirer bank 26 (shown in FIG. 1).

In the exemplary embodiments, authentication server 112 is in communication with a plurality of data gathering computer devices 106 and one or more access control servers (ACS) 108. In some embodiments, authentication server 112 is similar to RBA platform 34 (shown in FIG. 1). In the exemplary embodiment, authentication server 112 receives data from data gathering computer device 106 and uses that data to perform authentication of payment transactions. In some embodiments, authentication server 112 performs authentication with ACS 108. In other embodiments, authentication server 112 replaces the ACS 108 in the authentication process. In the exemplary embodiment, authentication server 112 is associated with the interchange network 28 (shown in FIG. 1). In other embodiments, the authentication server 112 is merely in communication with the interchange network 28.

In the exemplary embodiment, issuer computing devices 110 are computers that include a web browser or a software application, which enables issuer computing devices 110 to access remote computer devices, such as ACS 108 and authentication server 112, using the Internet or other network. More specifically, issuer computing devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Issuer computing devices 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, issuer computing devices 110 are associated with the issuer bank 30 (shown in FIG. 1).

A database server 116 is connected to database 120. In one embodiment, centralized database 120 is stored on server system 112 and can be accessed by potential users at one of client systems (not shown) by logging onto authentication server 112 through one of client systems. In an alternative embodiment, database 120 is stored remotely from authentication server 112 and may be non-centralized. Database 120 may be a database configured to store information used by authentication server 112 including, for example, historical payment transaction records.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authentication and authorization request data. Database 120 may store one or more authentication profiles, where each authentication profile includes one or more authentication rules, one or more risk level thresholds, and one or more routing rules based on the risk level thresholds.

Figure 3:
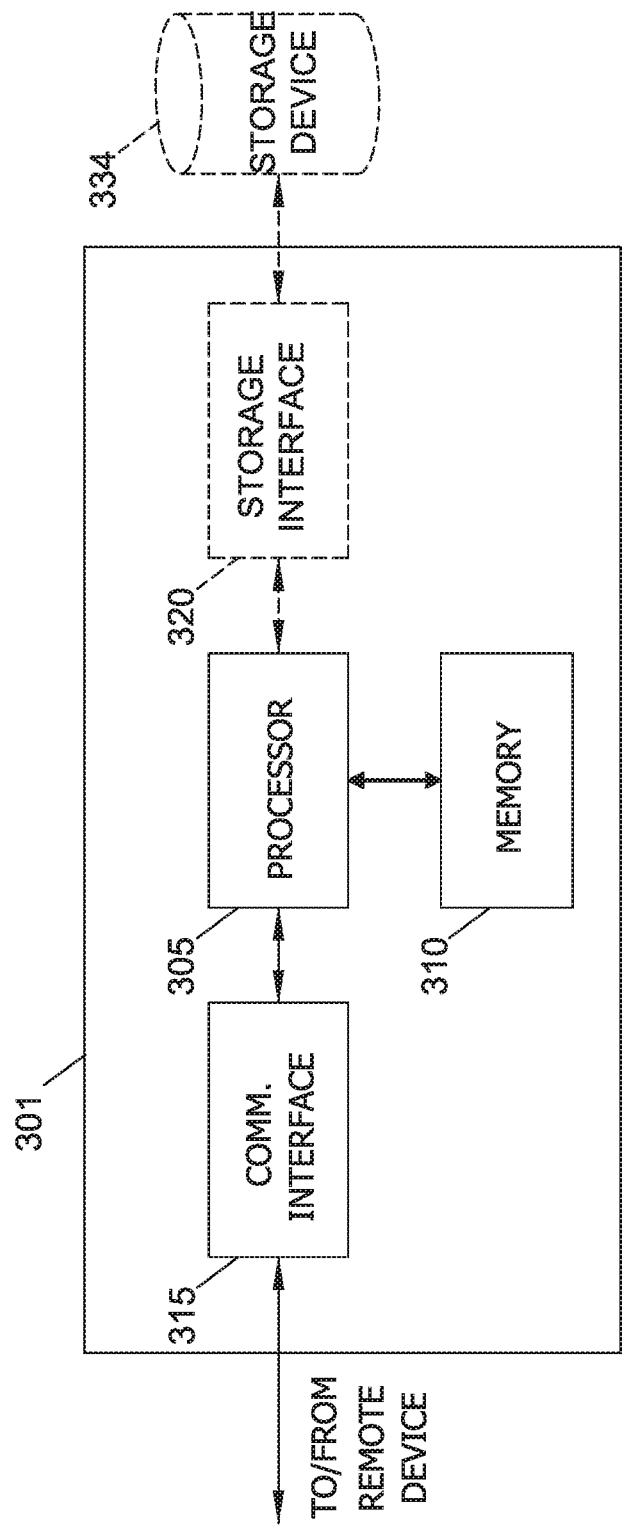

FIG. 3 illustrates an example configuration of a server system 301 such as RBA platform 34 (shown in FIG. 1), in accordance with one example embodiment of the present disclosure. Server system 301 may also include, but is not limited to, merchant website 104, data gathering computer device 106, ACS 108, issuer computing device 110, authentication server 112, and database server 116 (all shown in FIG. 2). In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from a client system (not shown) via the Internet, as illustrated in FIG. 2.

Processor 305 may also be operatively coupled to a storage device 334. Storage device 334 is any computer-operated hardware suitable for storing and/or retrieving data. In some embodiments, storage device 334 is integrated in server system 301. For example, server system 301 may include one or more hard disk drives as storage device 334. In other embodiments, storage device 334 is external to server system 301 and may be accessed by a plurality of server systems 301. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 4:
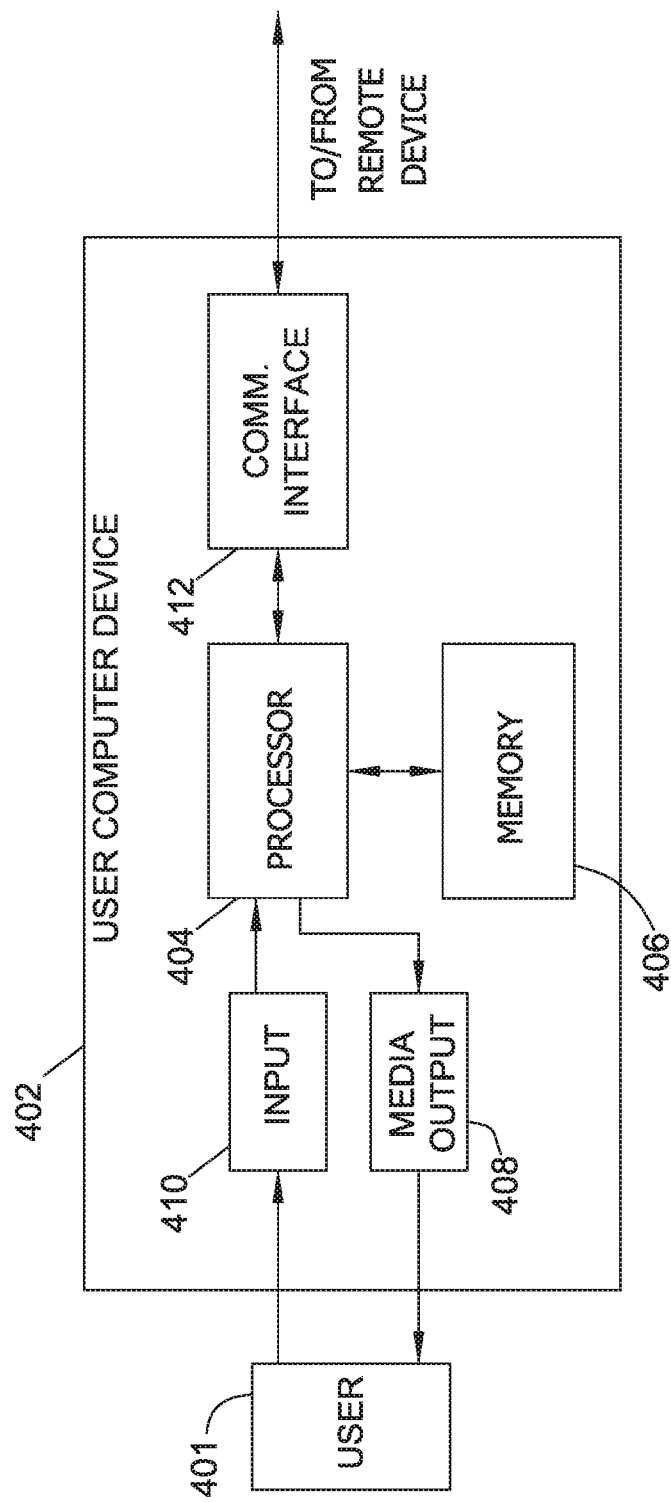

FIG. 4 illustrates an example configuration of a client computing device 402. Client computing device 402 may include, but is not limited to, cardholder computing device 102 (shown in FIG. 1). Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400. Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 301 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Figure 5:
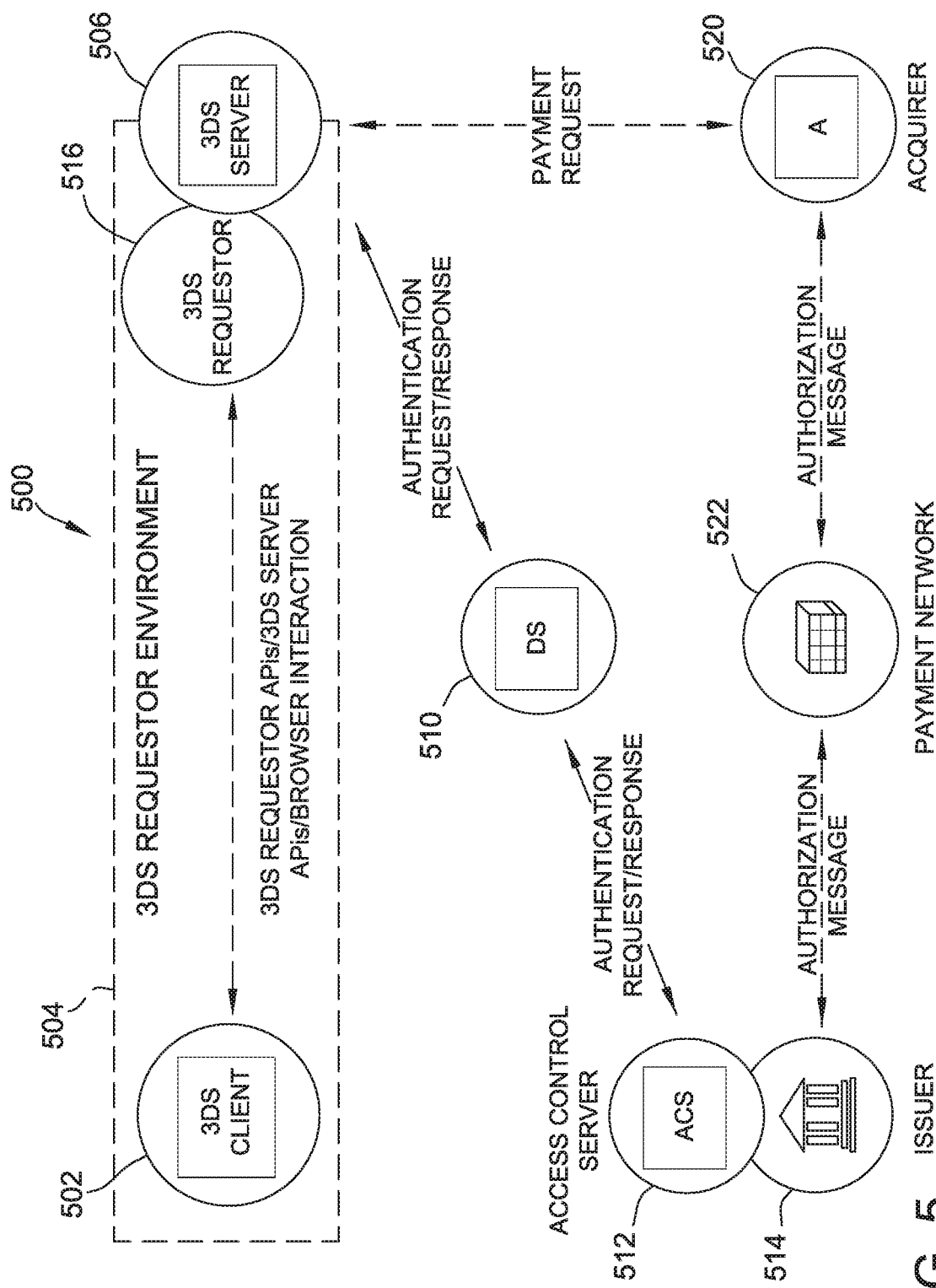

FIG. 5 is a schematic diagram illustrating transaction flow in an example authentication system 500 that uses the 3DS 2 Protocol (or subsequent versions of the 3DS Protocol) for authentication. Information regarding the 3DS Protocol, including the current version of the protocol, can be found at emvco.com. System 500 includes a directory server 510 that facilitates authenticating a cardholder for a transaction, as described herein. Directory server 510 may be operated, for example, by interchange network 28 (shown in FIG. 1).

A cardholder (e.g., cardholder 22, shown in FIG. 1) initiates a transaction (e.g., an online transaction) on a cardholder computing device 102 (shown in FIG. 2), such as, for example, a mobile computing device. During initiation of the transaction, the cardholder provides authentication data that will ultimately be used to authenticate the cardholder. In the exemplary embodiment, this authentication data includes form data that the cardholder fills in to make the purchase and scraped data, which is data about the cardholder, such as device details and browser details including device ID, IP address, device channel, etc.

The authentication data is transmitted from the cardholder computing device 102 to a 3DS client 502 within a 3DS requestor environment 504. The 3DS client 502 may be operated by a merchant (e.g., merchant 24, shown in FIG. 1). In some embodiments, 3DS client 502 is a part of merchant website 104 (shown in FIG. 2). 3DS client 502 collects, from the cardholder computing device 102, information necessary to authenticate the cardholder using the 3DS 2 Protocol, including the authentication data.

The 3DS client 502 collects information (including the authentication data) and transmits the collected information to a 3DS server 506 for inclusion in an authentication request message, also referred to herein as an AReq message. 3DS client 502 is also part of the 3DS requestor environment 504. 3DS client 502 and 3DS server 506 may communicate with one another, for example, using application programming interfaces (APIs) or browser interactions. In some embodiments, the 3DS server 506 is similar to data gathering computer device 106 (shown in FIG. 2).

Using the authentication data provided by the cardholder and other data collected within 3DS requestor environment 504, the 3DS server 506 generates the AReq message and transmits the AReq message to directory server 510, based on the payment processor associated with the transaction card being used in the transaction. In some embodiments, the directory server 510 is similar to the authentication server 112 (shown in FIG. 2). That is, different payment processors will generally have different directory servers for processing transactions. When generating the AReq message, 3DS server 506 formats the data for security purposes. In this embodiment, directory server 510 forwards the AReq message to an appropriate access control server (ACS) 512, based on the issuer of the payment card. In some embodiments, ACS 512 is similar to ACS 108 (shown in FIG. 2)

ACS 512 determines, based on the AReq message, whether authentication is required. Further, ACS 512 facilitates ensuring that any required authentication is properly carried out. ACS 512 performs these authentication operations on behalf of an issuer operating an issuer computing device 514.

In response to the AReq message, ACS 512 returns an authentication response (ARes) message to directory server 510, which directory server 510 in turn forwards to 3DS server 506. Before returning the ARes message, ACS 512 evaluates the data in the AReq message and performs risk-based authentication (RBA) on the transaction. Specifically, when ACS 512 determines that an explicit cardholder step-up authentication is not required (i.e., when the transaction is determined to be low risk), ACS 512 determines authentication is complete and returns an ARes indicating the same. If, however, ACS 512 determines that cardholder step-up authentication is required, ACS 512 initiates a step-up challenge request. The results of the step-up challenge requests are transmitted (in the ARes message), to 3DS server 506 (via directory server 510), and ultimately to the cardholder. If step-up authentication is required, ACS 512 controls the step-up authentication in accordance with methods used for cardholders of the issuer (e.g., biometric authentication, one time password (OTP) authentication, short message service (SMS) authentication, etc.). A 3DS requestor 516 included in 3DS requestor environment 504 controls how the various components interact with one another in the example embodiment.

After the authentication process is complete (i.e., after the 3DS Protocol is finished), if the cardholder is successfully authenticated, payment authorization for the transaction is undertaken. That is, the authentication using the 3DS 2 Protocol (or subsequent versions of the 3DS Protocol) occurs before payment authorization for the transaction.

For payment authorization, the merchant (e.g., using 3DS server 506) exchanges authorization data with an acquirer computing device 520 operated by an acquirer, such as merchant bank 26 (shown in FIG. 1) and a payment network 522, such as interchange network 28 (shown in FIG. 1). If appropriate, the merchant, acquirer, or payment network may submit an authorization request including information that indicates authentication occurred. Acquirer computing device 520 then processes the authorization with issuer computing device 514 and returns the authorization results to the merchant.

The 3DS 2 Protocol (and subsequent versions of the 3DS Protocol) provides a number of benefits to cardholders, issuers, and merchants. It reduces risk of unauthorized transactions through an approach that incorporates a rich, comprehensive set of data to make authentication decisions. For cardholders, it provides a simple, secure, and familiar online authentication experience, regardless of payment channel or device. For issuers, it allows for "frictionless" authentication, in which an explicit cardholder step-up authentication is not required or performed. This enables more intelligent risk assessment decisions and the ability to selectively challenge the cardholder as needed. This also improves cardholder experience and overall cardholder loyalty to issuers. For merchants, the 3DS 2 Protocol decreases fraud on all authenticated transactions, and increases revenue potential from reduced friction and reduced cart abandonment (i.e., cardholders deciding not to complete a transaction after they have already selected one or more items to be purchased), especially for mobile payment channels. This also improves cardholder experience and overall cardholder loyalty to merchants.

Using 3DS 2 Protocol (or subsequent versions of the 3DS Protocol), payment networks see 100% of all authentication requests globally on all cards on their brands. No other party, including issuers and ACS providers, is able to provide this global visibility. This global visibility may be leveraged to provide a consistent, standards-based risk analysis of transactions on behalf of issuers, enabling a market-wide risk-based authentication approach.

As compared to previous authentication methods (e.g., 3DS 1.0), the 3DS 2 Protocol (and subsequent versions of the 3DS Protocol) allows for approximately ten times the amount of transaction data to be gathered, analyzed, and utilized to prevent fraud. The additional data included in the 3DS Protocol increases data exchange between merchants and issuers, and improves risk-based authentication (RBA) decisioning. RBA allows issuers to examine every authentication request through transaction risk analysis, while focusing fraud prevention efforts on transactions that prevent the most risk. Further, RBA utilizes both behavioral and transactional inputs in conjunction with a risk engine to determine riskiness of a transaction.

Transactions deemed safe or low risk are silently authenticated (i.e., so-called "frictionless" authentication), while higher risk transactions are subjected to step-up authentication. When a low risk transaction is silently authenticated, so much data has already been gathered that further authentication adds little to no value. Accordingly, RBA effectively replaces the need for an explicit interaction with the cardholder for every transaction, but transactions are still fully authenticated, with liability resting with the issuer. Thus, more transactions are completed with minimal cardholder disruption, aiding e-commerce growth.

One goal of RBA is to minimize the number of transactions that require active (i.e., step-up) authentication, while keeping fraud to a minimum and improving consumer friction points during the transaction process. With RBA, the information gathered enables transaction scoring and classification into low, medium, and high risk, allowing the issuer and ACS 512 to take appropriate action.

The 3DS 2 Protocol (and subsequent versions of the 3DS Protocol) enables a market-wide level risk analysis of all transactions that reach directory server 510. Each transaction can be scored and/or flagged based on the global data available using the 3DS 2 Protocol (and subsequent versions of the 3DS Protocol). Additionally, the payment processor operating the directory server 510 has the ability to see cardholder activity across the digital and physical domains, and can utilize this expanded view to improve scoring. In contrast, traditional authentication service providers may only address the digital domain. For example, a payment processor could indicate if a particular device is associated with fraud, and flag that device for issuers in future transactions. The issuer may then reject transactions involving that device or prompt for additional authentication (e.g., through two-factor authentication).

The following Table 2 lists a number of the data elements that are used in the 3DS 2 Protocol for authentication. For example, at least some of these data elements may be included in the authentication data included in the AReq sent to directory server 510. The eighteen data elements that are also part of the 3DS 1.0 Protocol are bolded in Table 2. Those of skill in the art will appreciate that the number of rich data elements could grow beyond those listed below (e.g., in future versions of the 3DS Protocol), and could include over one hundred and seventy data elements. Further, an app-based transaction (e.g., carried out using a mobile computing device) could provide even more data elements than browser-based transactions. In addition, a transaction performed using an Android device could have over one hundred and thirty additional elements.

TABLE 2

| | Data Element |
|---|---|
| 1 | 3DS Requestor Authentication Information |
| 2 | 3DS Requestor Challenge Indicator |

TABLE 2-continued

| | Data Element |
|---|---|
| 3 | 3DS Requestor ID |
| 4 | 3DS Requestor Initiated Indicator |
| 5 | 3DS Requestor Name |
| 6 | 3DS Requestor Non-Payment Authentication Indicator |
| 7 | 3DS Requestor Prior Transaction Authentication Information |
| 8 | 3DS Requestor URL |
| 9 | 3DS Server Operator ID |
| 10 | 3DS Server Reference Number |
| 11 | 3DS Server Transaction ID |
| 12 | 3DS Server URL |
| 13 | Account Type |
| 14 | Acquirer BIN |
| 15 | Acquirer Merchant ID |
| 16 | ACS Challenge Mandated Indicator |
| 17 | ACS Counter ACS to SDK |
| 18 | ACS HTML |
| 19 | ACS Operator ID |
| 20 | ACS Reference Number |
| 21 | ACS Rendering Type |
| 22 | ACS Signed Content |
| 23 | ACS Transaction ID |
| 24 | ACS UI Type |
| 25 | Address Match Indicator |
| 26 | Authentication Method |
| 27 | Authentication Type |
| 28 | Authentication Value |
| 29 | Browser Accept Headers |
| 30 | Browser IP Address |
| 31 | Browser Java Enabled |
| 32 | Browser Language |
| 33 | Browser Screen Color Depth |
| 34 | Browser Screen Height |
| 35 | Browser Screen Width |
| 36 | Browser Time Zone |
| 37 | Browser User-Agent |
| 38 | Card/Token Expiry Date |
| 39 | Cardholder Account Identifier |
| 40 | Cardholder Account Information |
| 41 | Cardholder Account Number |
| 42 | Cardholder Billing Address City |
| 43 | Cardholder Billing Address Country |
| 44 | Cardholder Billing Address Line 1 |
| 45 | Cardholder Billing Address Line 2 |
| 46 | Cardholder Billing Address Line 3 |
| 47 | Cardholder Billing Address Postal Code |
| 48 | Cardholder Billing Address State |
| 49 | Cardholder Email Address |
| 50 | Cardholder Home Phone Number |
| 51 | Cardholder Mobile Phone Number |
| 52 | Cardholder Name |
| 53 | Cardholder Shipping Address City |
| 54 | Cardholder Shipping Address Country |
| 55 | Cardholder Shipping Address Line 1 |
| 56 | Cardholder Shipping Address Line 2 |
| 57 | Cardholder Shipping Address Line 3 |
| 58 | Cardholder Shipping Address Postal Code |
| 59 | Cardholder Shipping Address State |
| 60 | Cardholder Work Phone Number |
| 61 | Challenge Additional Information Text |
| 62 | Challenge Cancelation Indicator |
| 63 | Challenge Data Entry |
| 64 | Challenge HTML Data Entry |
| 65 | Challenge Information Header |
| 66 | Challenge Information Label |
| 67 | Challenge Information Text |
| 68 | Challenge Information Text Indicator |
| 69 | Challenge Selection Information |
| 70 | Challenge Window Size |
| 71 | Device Channel |
| 72 | Device Information |
| 73 | Device Rendering Options Supported |
| 74 | DS Reference Number |
| 75 | DS Transaction ID |
| 76 | DS URL |
| 77 | Electronic Commerce Indicator |
| 78 | EMV Payment Token Indicator |
| 79 | Expandable Information Label 1 |
| 80 | Expandable Information Text 1 |
| 81 | Instalment Payment Data |
| 82 | Interaction Counter |
| 83 | Issuer Image |
| 84 | Merchant Category Code |
| 85 | Merchant Country Code |
| 86 | Merchant Name |
| 87 | Merchant Risk Indicator |
| 88 | Message Category |
| 89 | Message Extension |
| 90 | Message Type |
| 91 | Message Version Number |
| 92 | Notification URL |
| 93 | OOB App Label |
| 94 | OOB App URL |
| 95 | OOB Continuation Indicator |
| 96 | OOB Continuation Label |
| 97 | Payment System Image |
| 98 | Purchase Amount |
| 99 | Purchase Currency |
| 100 | Purchase Currency Exponent |
| 101 | Purchase Date & Time |
| 102 | Recurring Expiry |
| 103 | Recurring Frequency |
| 104 | Resend Challenge Information Code |
| 105 | Resend Information Label |
| 106 | Results Message Status |
| 107 | SDK App ID |
| 108 | SDK Counter SDK to ACS |
| 109 | SDK Encrypted Data |
| 110 | SDK Ephemeral Public Key (Qc) |
| 111 | SDK Reference Number |
| 112 | SDK Transaction ID |
| 113 | Submit Authentication Label |
| 114 | Transaction Status |
| 115 | Transaction Status Reason |
| 116 | Transaction Type |
| 117 | Why Information Label |
| 118 | Why Information Text |

As explained above, in the embodiment shown in FIG. 5, ACS 512 performs authentication using RBA capabilities. However, many ACS providers that are issuer processors for authentication do not have RBA capabilities. Further, ACS providers with RBA capabilities may temporarily lose those capabilities (e.g., due to equipment malfunction). In light of the above-described advantages of the 3DS 2 Protocol (and subsequent versions of the 3DS Protocol), ACS providers without RBA capabilities risk losing customers to other ACS providers that have this capability. Accordingly, it would be desirable to facilitate 3DS 2 Protocol (and subsequent versions of the 3DS Protocol) authentication for ACS providers that do not have RBA capabilities.

Figure 6:
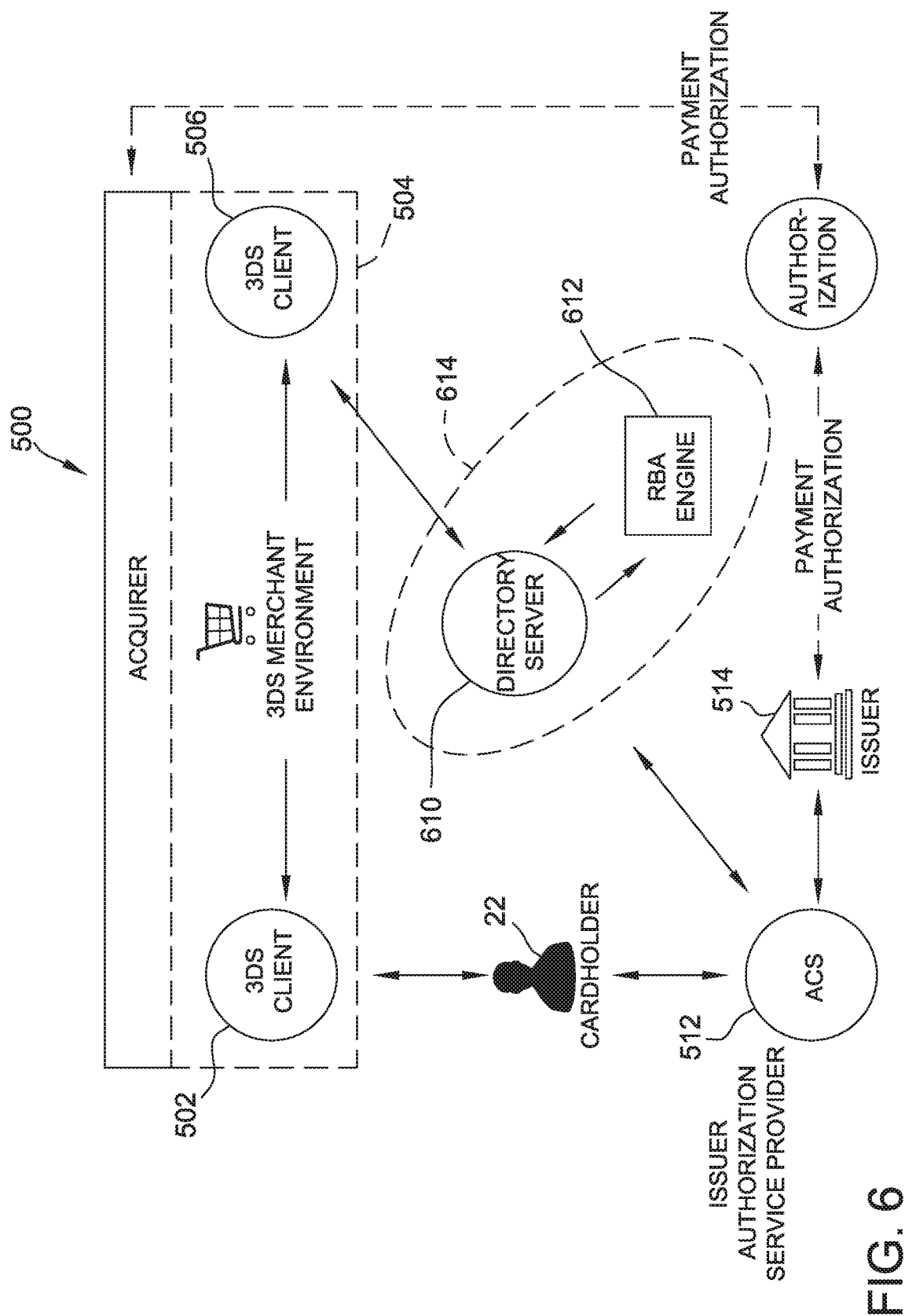

FIG. 6 is a schematic diagram illustrating transaction flow in another example authentication system 600 that uses the 3DS 2 Protocol (or subsequent versions of the 3DS Protocol) for authentication, and that performs RBA on behalf of ACS providers that are unable to perform RBA. Unless otherwise indicated, components of authentication system 600 are substantially similar to those of authentication system 500 (shown in FIG. 5).

Instead of directory server 510, authentication system 600 includes an RBA-enabled directory server 610 communicatively coupled to a RBA engine 612 (which may be collectively referred to as an authentication platform 614). RBA-enabled directory server 610 and RBA engine 612 facilitate performing RBA behalf of ACS providers, as described herein. RBA-enabled directory server 610 and RBA engine 612 may be operated, for example, by interchange network 28 (shown in FIG. 1). In some embodiments, authentication platform 614 is similar to RBA platform 34 (shown in FIG. 1) and authentication server 112 (shown in FIG. 2).

As in authentication system 500, RBA-enabled directory server 610 receives an AReq message from 3DS server 506. However, instead of immediately forwarding the AReq message to ACS 512, RBA-enabled directory server 610 transmits at least some of the data in the AReq message (e.g., the authentication data) to RBA engine 612.

In the example embodiment, RBA engine 612 analyzes the data in the AReq message to generate RBA result data. For example, RBA engine 612 may compare the data in the AReq message to one or more long term variables ("LTV"). The one or more LTV may include historical authentication data associated with the PAN at issue, historical authorization data associated with the PAN, other historical data associated with the PAN, etc. The LTV may be associated with both card present and card not present historical transactions. For example, the LTV may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the LTV may be stored in a database accessible by RBA engine 612 and operated by interchange network 28. In some embodiments, the LTV data will be hashed prior to storing to protect the security of this personally identifiable information.

In addition, the data in the AReq message may also be compared to other parameters. For example, to monitor consistency and changes in behavior, the data may be compared to short term (e.g., on the order of minutes, hours, or days) PAN velocities and ratios, including velocities and ratios of PAN authorization and authentication. This may include comparing to recent transaction frequency, amount spent, declines, historical risk scores, etc. Alternatively, the data in the AReq message may be analyzed using any suitable techniques to generate RBA result data, as described herein.

In the example embodiment, the RBA result data generated by RBA engine 612 includes a risk score, a risk analysis, and at least one reason code. The risk score is a score representing a determined riskiness of the transaction, with lower scores indicating lower risk and higher scores indicating higher risk. In other words, the risk score represents a likelihood that the suspect cardholder (e.g., the person attempting to perform a transaction) is the legitimate cardholder having the privileges to use the payment card to perform a payment transaction. For example, the risk score may be represented by a number from 0-999 and/or by a risk threshold category from 0-19. In some embodiments, risks assessments that will be shared, such as through the authorization field of one or more messages will be quantified on a scale of 0-9. Those of skill in the art will appreciate that any suitable risk score may be used.

The risk analysis is a description of a level of risk corresponding to the risk score (e.g., low risk, medium risk, or high risk). Further the reason codes include one or more factors that influenced the risk score. RBA engine 612 transmits the RBA result data to RBA-enabled directory server 610.

In some embodiments, the reason codes are generated based on a plurality of reason code categories and associated anchors. Specifically, different categories are established, and each category is associated with a plurality of activatable anchors, as described herein. Based on the analysis of the data in the AReq message, RBA engine 612 may activate one or more anchors. The reason codes are then generated based on which anchors (and how many anchors) are activated. In some embodiments, the reason codes are affected by rules and/or a combination of the rules and the model.

For example, in one embodiment, three risk code categories are established: cardholder, merchant, and environment. In this example, the cardholder category is associated with five anchors (shipping address, PAN, billing address, email, and phone), the merchant category is associated with three anchors (merchant name, merchant category, and merchant country), and the environment category is associated with three anchors (device info, IP address, and device channel). Those of skill in the art will appreciate that additional and/or alternative anchors may be established.

Based on analysis of the data in the AReq message, RBA engine 612 may activate at least one anchor. For example, for the cardholder category, if RBA engine 612 determines that a shipping address for the transaction has been used with the PAN in past transactions and/or the shipping address is unchanged from prior transaction, RBA engine 612 may activate the shipping address anchor. Further, RBA engine 612 may activate the PAN anchor of the cardholder category if the PAN has had successful authentications in past transactions.

For the merchant category, one or more anchors may be activated based fraud rates for the merchant, decline rates for the merchant, and non-cleared transaction rates for the merchant. Further, one or more anchors may be activated when RBA engine 612 determines the merchant category and merchant location for the transaction are consistent with historical transactions for that merchant.

For the environment category, the IP address anchor may be activated if the IP address is known and is not on a list of "bad" IP addresses. Further, the device anchor may be activated if the device is known and is not on a list of "bad" devices, the device has had successful authentications in past transactions, and/or the device has scored well in past transactions.

The following are some additional examples of criteria for activating anchors for the different categories. In one example, the shipping address anchor is activated if the shipping address has been used with the PAN in past transactions, the shipping address is the same as the billing address on file, the shipping address is not on a list of "bad" shipping addresses, and the shipping address is unchanged from a prior transaction. In a second example, the shipping address anchor, the billing address anchor, and the PAN anchor (i.e., all anchors for the cardholder category) are activated when the shipping address is consistent with previous transactions, the billing address is consistent with previous transactions, the PAN has historical positive association with the cardholder, and the purchase amount, date, and time are consistent with previous transactions. In a third example, anchors for both the cardholder category and the merchant category are activated when the contact information for the cardholder is consistent with previous transactions, the cardholder is a trusted cardholder, the merchant is a trusted merchant, and the PAN shows established activity and authentication history at the merchant. Those of skill in the art will appreciate that the anchors may be activated based on any suitable conditions.

The reasons codes are generated based on the activated anchors, and are loosely structured in a hierarchical order based on connections between anchors in different categories. For example, if at least one anchor in the cardholder category is activated, a positive reason code (i.e., indicating relatively low risk) is generated. If, instead, at least one anchor in the cardholder category is activated and at least one anchor in the merchant category is also activated, a stronger positive reason code related to both categories is generated. Similarly, if at least one anchor in the cardholder category is activated, at least one anchor in the merchant category is activated, and at least one anchor in the environment category is activated, an even stronger positive reason code related to all three categories is generated.

The following Table 3 lists of number of example reason codes. However, those of skill in the art will appreciate that additional and/or alternative reason codes may be utilized in accordance with the embodiments described herein.

TABLE 3

| Code | Reason Code Name | Description and Comments |
|---|---|---|
| A | Risk Event - Suspicious Account Activity | Merchant or payment network has detected suspicious activity with cardholder's account |
| B | Risk Event - Unknown Device/Account Relationship | Merchant or payment network has not established a relationship between the device and account |
| C | Risk Event - Device or Profile Information associated with fraud event | The device used for the transaction or the user's profile has been associated with a fraud event |
| D | Risk Event - Recent High Risk Change to Device or Profile Information | The device used for the transaction or the user's profile has recently had a high risk change |
| E | Risk Event - Recent change to Device or Profile Information | The device used for the transaction or the user's profile has recently changed |
| F | Risk Event - PAN associated with fraud event | Merchant or payment network has detected fraud associated with the PAN used for this transaction |
| G | New Account or Insufficient Data | This is a new account with the merchant (or new cardholder details to payment network) or there is insufficient data for this cardholder |
| H | Merchant/Acquirer: Merchant (fraud) risk high (assessed by payment network) | Payment network has determined that the merchant is submitting transactions with a high rate of fraud |
| I | Merchant/Acquirer: Merchant (fraud) risk low (assessed by payment network) | Payment network has determined that the merchant is submitting transactions with a higher rate of fraud than average |
| J | Environment: Good/Known IP | Merchant or payment network is familiar with the IP address where the transaction is happening and has assessed that it is a good, trusted IP |
| K | Cardholder: Billing address - prior history established | Merchant or payment network has established a positive association between the cardholder and this billing address |
| L | Cardholder: Email address - prior history established | Merchant or payment network has established a positive association between the cardholder and this email address. |
| M | Cardholder: Phone number - prior history established | Merchant or payment network has established a positive association between the cardholder and this phone number. |
| N | Cardholder: Shipping address - prior history established | Merchant or payment network has established a positive association between the cardholder and this shipping address. |
| O | Cardholder: Card number (PAN) behavior established high trust in the current transaction | Merchant or payment network has established high trust in the transaction based on historical PAN behavior |
| P | Environment: Device known | Merchant or payment network has seen the device used for the transaction before, but this account might not be established on device |
| Q | Environment: Account established on Device | Merchant or payment network has seen this account transaction on this device AND account has been authenticated on the device |
| R | Environment: Session - Trusted/normal/innocent session (no man in the middle attack/no bot, not suspicious account activity) | Merchant or payment network determines quality of the session |
| S | More than one cardholder category anchor established | Merchant or payment network has established multiple cardholder category anchors |
| T | More than one merchant category anchor established | Payment network has established multiple merchant category anchors |
| U | More than one environment category anchor established | Merchant or payment network has established multiple environment category anchors |
| V | Co-occurring: established link between cardholder and merchant | Merchant or payment network has established linkages across cardholder and merchant categories |
| W | Co-occurring: established link between cardholder and environment | Merchant or payment network has established linkages across cardholder and environment categories |

TABLE 3-continued

| Code | Reason Code Name | Description and Comments |
|---|---|---|
| X | Co-occurring: established link between merchant and environment | Payment network has established linkages across merchant and environment categories |
| Y | All three categories established | Payment network has established linkages across cardholder, merchant, and environment categories |
| Z | Most Trusted (Reserved for future use) | Reserved for future use |

After RBA engine 612 generates the RBA result data (including the reason codes), RBA-enabled directory server 610 embeds the RBA result data into the AReq message to generate an enhanced AReq message. For example, in some embodiments, the RBA result data is appended to the AReq message as an extensible markup language (XML) extension of the AReq message. For example, the extension may have the following format:

```
"name": "ACS RBA",
"id": "A000000004-acsRBA",
"criticalityIndicator": "true",
"data": {
    "status":"success",
    "score":"150",
    "decision":"low risk",
    "reasonCode1":"Y",
    "reasonCode2":"J"}
``` where "score" is the risk score, "decision" is the risk analysis, and "reasonCode1" and "reasonCode2" are the reason codes. In the exemplary embodiment, the reason codes are transmitted as a single letter each. In other embodiments, the reason codes may be represented in different methods. In some embodiments, reasonCode2 is transmitted by the merchant to provide the merchant's assessment of the transaction. Alternatively, the RBA result data may be embedded into the AReq message to generate an enhanced AReq message using any suitable process.

The enhanced AReq message is then transmitted from RBA-enabled directory server 610 to ACS 512. ACS 512 then analyzes the RBA result data in the enhanced AReq message to make an authentication decision. That is, in the example embodiment, ACS 512 may determine to fully authenticate the transaction, deny authentication for the transaction, or perform additional authentication (e.g., by issuing a step-up challenge to the cardholder) for the transaction, based on at least one of the risk score, the risk analysis, and the reason codes. Accordingly, ACS 512 does not perform the RBA analysis, but is still able to leverage the results of that analysis to make an authentication decision (e.g., by using the results in their own fraud analysis platform), generally resulting in more approvals with less fraud. Thus, RBA-enabled directory server 610 and RBA engine 612 perform the RBA analysis on behalf of ACS 512.

In some embodiments, when the determined riskiness of the transaction is low enough, instead of generating and transmitting an enhanced AReq message to ACS 512, RBA-enabled directory server 610 fully authenticates the transaction itself. Specifically, when the determined riskiness of the transaction is low enough, RBA-enabled directory server 610 automatically generates an ARes that indicates the transaction has been fully authenticated, and transmits the ARes message to 3DS server 506. RBA-enabled directory server 610 determines that the riskiness of the transaction is low by comparing at least one of the risk score and the risk analysis to a predetermined threshold. The predetermined threshold may be specified, for example, by ACS 512. Accordingly ACS 512 is able to control which transactions will be fully authenticated without all transactions being forwarded to ACS 512.

Bypassing ACS 512 for low risk transactions reduces the overall message volume on the payment network. This in turn frees up network resources, improving transmission speed and overall capability of the payment network. Furthermore, in some embodiments, RBA-enabled directory server 610 determines if ACS 512 is available. In some situations, ACS 512 may be off-line or unavailable. If the ACS 512 is available, then the RBA-enabled directory server 610 may route the enhanced AReq message including the RBA result data to the ACS 512. If the ACS 512 is not available, RBA-enabled directory server 610 may perform the authentication processing.

Figure 7:
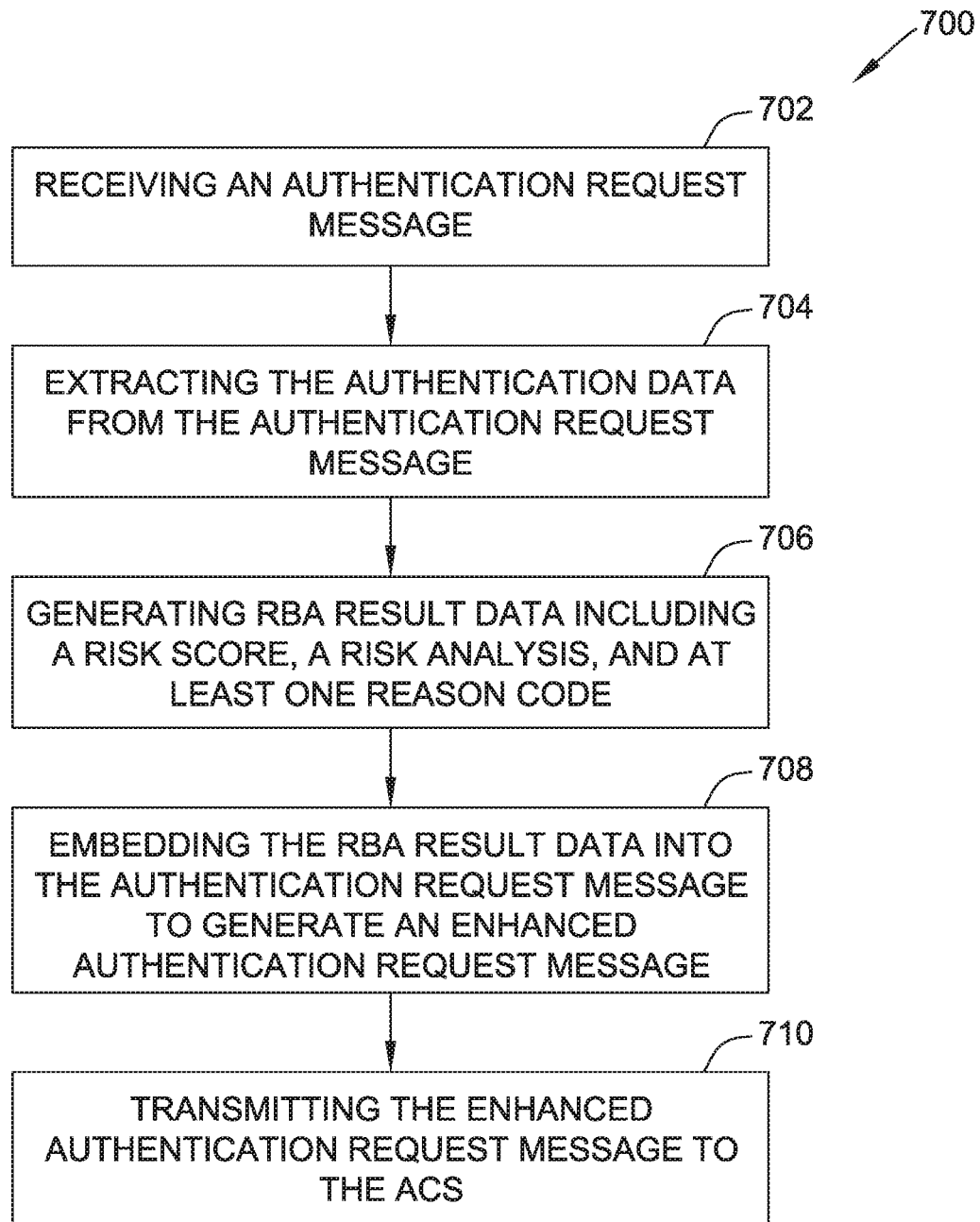

FIG. 7 is a flow diagram of an example method 700 for authenticating an online user on behalf of an access control server (ACS). Method 700 may be implemented, for example, using authentication platform 614 (shown in FIG. 6). Method 700 includes receiving 702 an authentication request message, the authentication request message includes authentication data. Method 700 further includes extracting 704 the authentication data from the authentication request message. Method 700 further includes 706 generating, based at least in part on the extracted authentication data, RBA result data including a risk score, a risk analysis, and at least one reason code. In addition, method 700 includes embedding 708 the RBA result data into the authentication request message to generate an enhanced authentication request message. Further, method 700 includes transmitting 710 the enhanced authentication request message to the ACS to enable the ACS to make an authentication decision based on the RBA result data.

Figure 8:
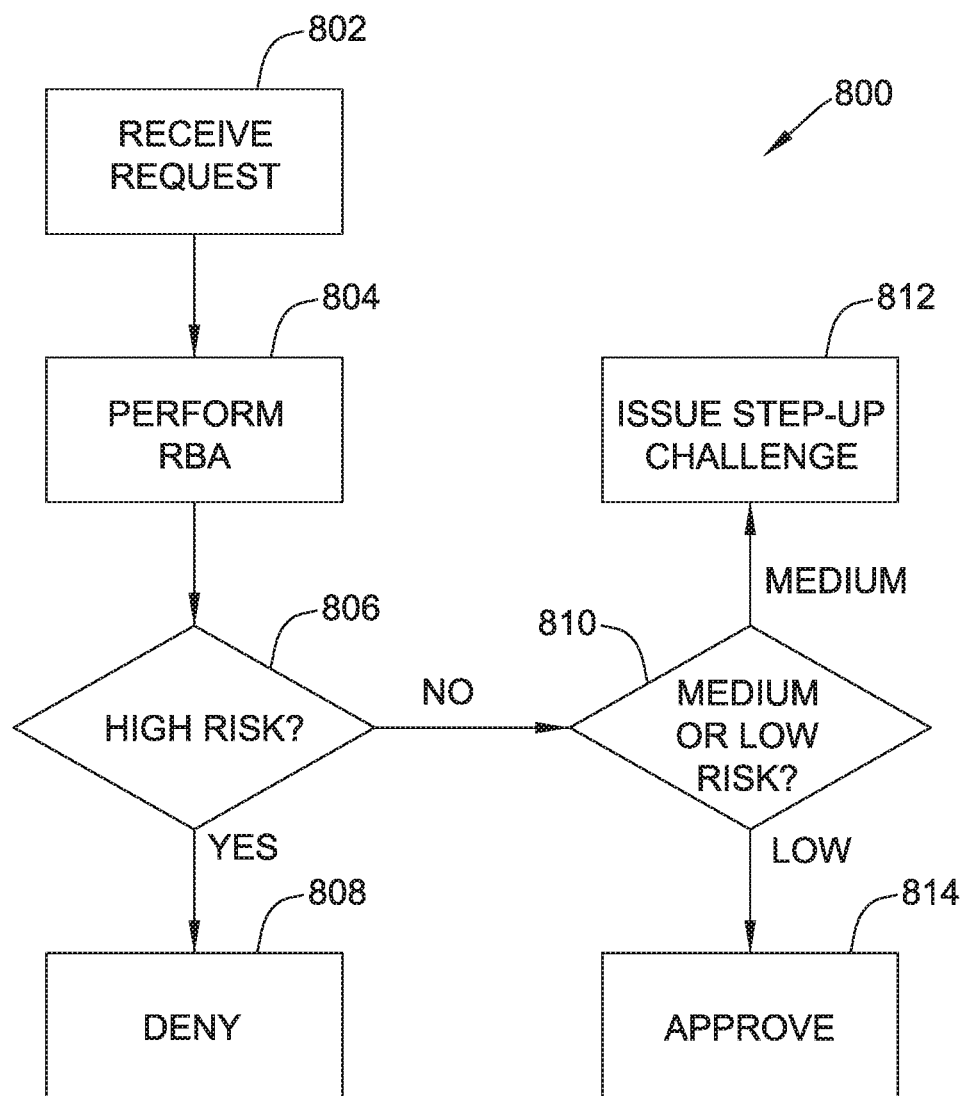

FIG. 8 is a flow diagram of another example method 800 for authenticating an online user. Method 800 may be implemented, for example, using authentication platform 614 (shown in FIG. 6).

In the example embodiment, authentication platform 614 receives 802 an authentication request message including authentication data, as described herein. Authentication platform 614 performs 804 RBA to generate RBA result data including a risk score, a risk analysis, and at least one reason code. The risk score is a score representing a determined riskiness of the transaction, with lower scores indicating lower risk and higher scores indicating higher risk. In other words, the risk score represents a likelihood that the suspect cardholder (e.g., the person attempting to perform a transaction) is the legitimate cardholder having the privileges to use the payment card to perform a payment transaction. For example, the risk score may be represented by a number from 0-999 and/or by a risk threshold category from 0-19.

The risk analysis is a description of a risk level corresponding to the risk score (e.g., low risk, medium risk, or high risk). The reason codes include one or more factors that influenced the risk score.

In the example embodiment, authentication platform 614 compares the RBA result data to a stored authentication profile. The authentication profile contains a plurality of rules for the processing of authentication requests. In some embodiments, the authentication profile is provided by the issuer computing device 514 (shown in FIG. 5). Examples of the rules include, but are not limited to, how to proceed when the ACS 512 (shown in FIG. 5) is unavailable, information to include in the RBA, risk level thresholds for the risk score and risk levels, decision making risk thresholds, and specialized rules (such as all cross-border transactions are to be submitted to the ACS 512). The authentication profile is stored at the RBA platform 34, and can be accessed whenever a risk score is determined.

In the example embodiment, authentication platform 614 compares the RBA result data to the authentication profile to determine the risk level associated with the transaction associated with the authentication request. In some embodiments, authentication platform 614 compares the risk score to one or more thresholds in the authentication profile to determine the risk level associated with the transaction. In other embodiments, authentication platform 614 compares the risk analysis, the reason codes, and/or any other combination of data from the RBA result data and potentially some or all of the authentication data to the authentication profile to determine the risk level associated with this transaction. For example, a risk score of 900 or less may be considered low risk, a risk score between 900 and 980 may be considered medium risk, and a risk score above 980 may be considered high risk. Those skilled in the art will appreciate that any suitable risk score thresholds and any number of risk levels may be used.

In the example embodiment, authentication platform 614 determines 806 if the risk level is high risk. For example, authentication platform 614 may determine 806 that the transaction is clearly fraudulent. In which case, authentication platform 614 fails the authentication and denies 808 the transaction. Authentication platform 614 transmits an authentication response (ARes) message including the denial to 3DS server 506 (shown in FIG. 5). The 3DS server 506 may transmit the Ares message including the denial to the merchant, where the merchant determines whether or not to proceed with the authorization process. In these embodiments, where the merchant begins the authorization process after having received a denial, the transaction is considered to be merchant only authentication, where the merchant assumes the risk for the transaction.

When authentication platform 614 determines the transaction is clearly fraudulent, authentication platform 614 denies the transaction without sending on authentication data (e.g., to the ACS and/or issuer). Specifically, authentication platform 614 fails the authentication and communicates the failure to the authentication requestor in the ARes message. Based on this failure, the merchant should not then submit the transaction for authorization, thus terminating the transaction. Accordingly, because the transaction is denied during authentication (and prior to authorization), no authorization messages are sent over the payment processing network. This protects the security of the payment processing network, because the payment processing network is never exposed to authorization data associated with the fraudulent transaction. Further, authentication platform 614 may notify the issuer and/or merchant that the transaction was clearly fraudulent, enabling the issuer and/or merchant to take appropriate action (e.g., flagging the associated account number and/or cardholder).

Authentication platform 614 determines 810 if the transaction is medium risk or low risk. If the transaction is low risk, authentication platform 614 may approve 814 the transaction and transmit an authentication response (ARes) message including the approval to 3DS server 506, where at least one of the 3DS server 506 and the merchant may initiate the authorization process. If the transaction is medium risk, authentication platform 614 may issue 812 a step-up challenge to the cardholder 22 (shown in FIG. 1). Based on the results of the step-up challenge, authentication platform 614 may approve or deny the transaction. In some embodiments, if the transaction is medium risk, authentication platform 614 transmits the RBA result data to ACS 512, so that the ACS 512 will perform the step-up challenge. In other embodiments, authentication platform 614 may take different steps at different risk levels and have additional or fewer risk levels to analyze based on the authentication profile.

Figure 9:
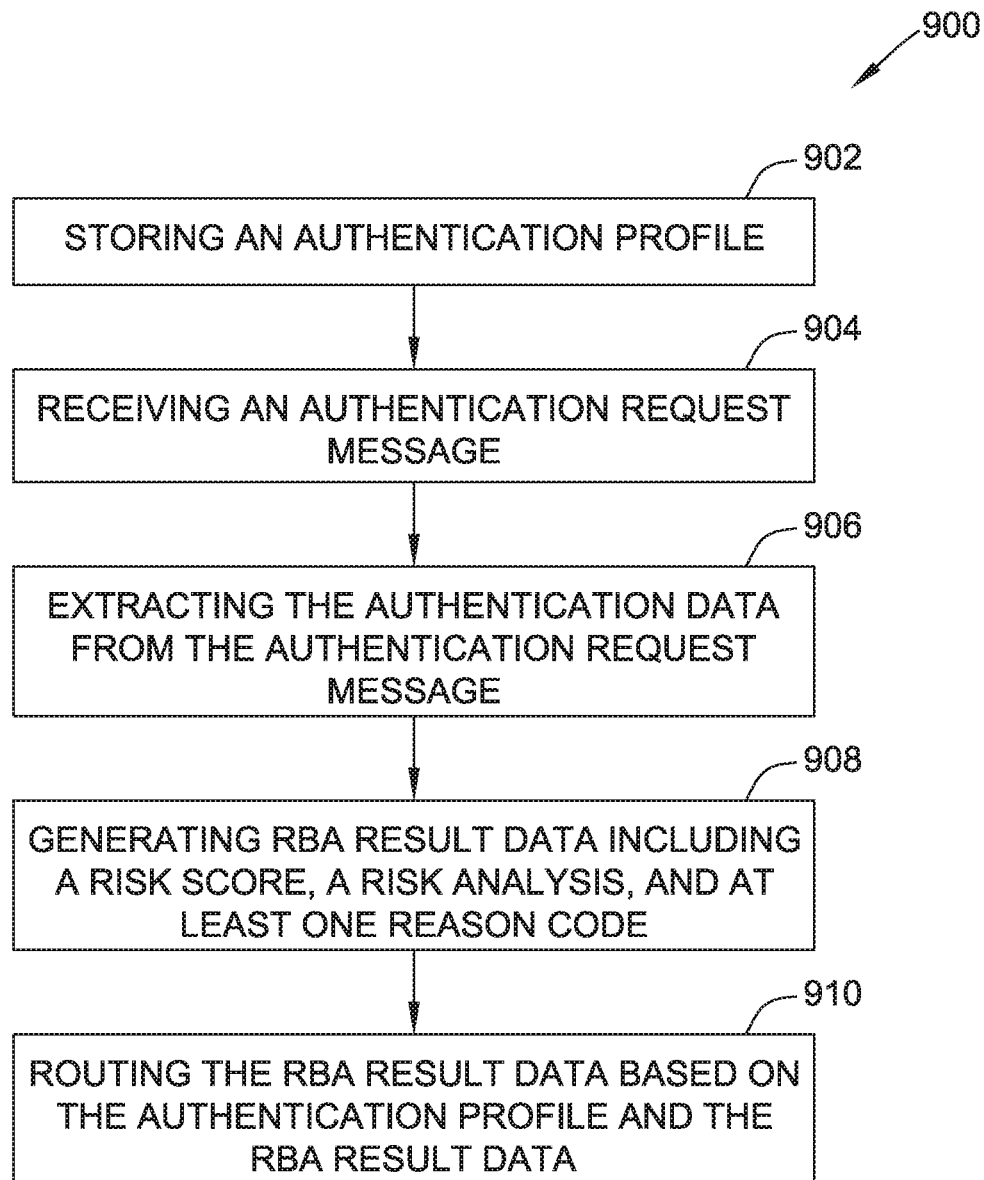

FIG. 9 is a flow diagram of another example method 900 for authenticating an online user. Method 900 may be implemented, for example, using authentication platform 614 (shown in FIG. 6). Method 900 includes storing 902 an authentication profile. The authentication profile contains a plurality of rules for the processing of authentication requests. The method 900 also includes receiving 904 an authentication request message, the authentication request message includes authentication data. Method 900 further includes extracting 906 the authentication data from the authentication request message. Method 900 further includes generating 908, based at least in part on the extracted authentication data, RBA result data including a risk score, a risk analysis, and at least one reason code. In addition, method 900 includes routing 910 the RBA result data based on the authentication profile and the RBA result data.

In some embodiments, the authentication platform 614 transmits the RBA result data to a source of the authentication request message, such as the 3DS server 506 (shown in FIG. 5). For example, in some embodiments, a merchant operating the 3DS server 506 may request and receive the RBA result data, including a risk score, a risk analysis, and at least one reason code as described herein. The merchant may use the RBA result data to update the merchant's own risk models, and may also compare the RBA result data to risk analysis results generated independently by the merchant to determine whether the RBA result data is generally consistent with the merchant-generated risk analysis results.

In some embodiments, the authentication request message is associated with an online payment card transaction. The authentication profile is associated with an issuer bank 30 (shown in FIG. 1). And the source of the authentication request message is the issuer computing device 514 (shown in FIG. 5). Accordingly, in some embodiments, the authentication platform 614 transmits the RBA result data directly to the issuer computing device 514, and handles authentication with the issuer computing device 514. For example, the issuer bank 30 may enroll a range of card numbers with the authentication platform 614, and request that the authentication platform 614 work directly with the issuer computing device 514 for authentication of transactions involving card numbers in the enrolled range.

In some embodiments, the authentication platform 614 determines whether an access control server (ACS) 512 (shown in FIG. 5) is available. If the ACS 512 is available, the authentication platform 614 embeds the RBA result data into the authentication request message to generate an enhanced authentication request message. The authentication platform 614 transmits the enhanced authentication request message to the ACS 512 to enable the ACS 512 to make an authentication decision based on the RBA result data. If the ACS 512 is unavailable, the authentication platform 614 generates an authentication decision based on the RBA result data and the authentication profile.

In some further embodiments, the authentication platform 614 determines a risk level based on the RBA result data and the authentication profile. In some of these embodiments, the risk level includes at least a low risk, a medium risk and a high risk for the transaction associate with the authentication request. In these embodiments, the authentication platform 614 transmits an authentication approval message to the 3DS server 506, if the risk level is low.

If the risk medium, the authentication platform 614 transmits a step-up challenge to the online user 22 (shown in FIG. 1) if the risk level is medium. The authentication platform 614 receives a response to the step-up challenge from the online user 22. The authentication platform 614 determines an authentication decision based on the response to the step-up challenge and the RBA result data. In some other embodiments, if the risk is medium, the authentication platform 614 transmits the RBA result data to the ACS 512 if the risk level is medium. The ACS 512 performs the step-up challenge with the online user 22.

If the risk is high, the authentication platform 614 transmits an authentication denied message to the 3DS server 506.

Figure 10:
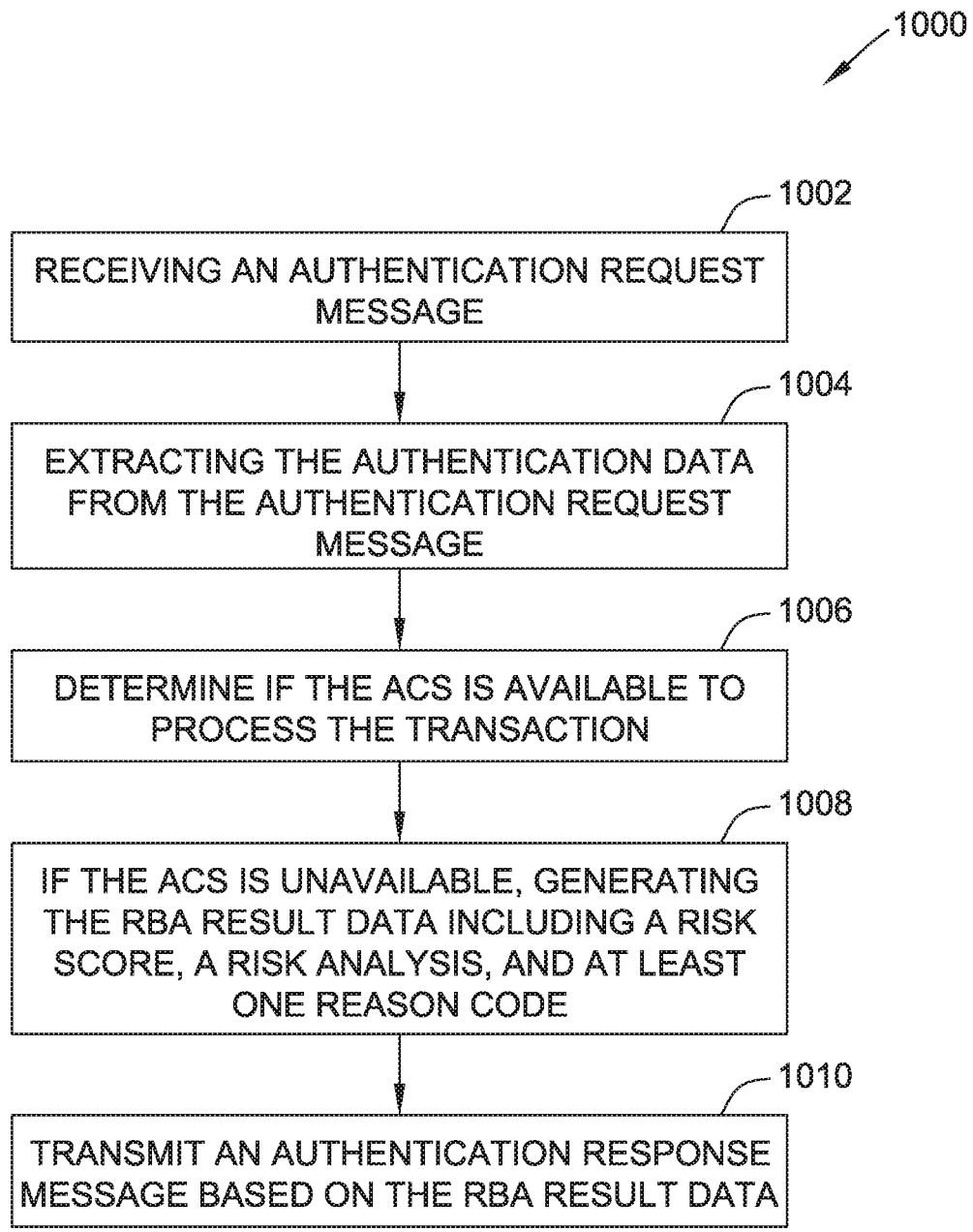

FIG. 10 is a flow diagram of a further example method 1000 for authenticating an online user. Method 1000 may be implemented, for example, using authentication platform 614 (shown in FIG. 6). Method 1000 includes receiving 1002 an authentication request message for a transaction. The authentication request message includes authentication data. The method 1000 also includes extracting 1004 the authentication data from the authentication request message. The method 1000 further includes determining 1006 if the ACS 512 is available to process the transaction. If the ACS 512 is unavailable, the method includes generating 1008, based at least in part on the extracted authentication data, risk-based authentication (RBA) result data including a risk score and at least one reason code that indicates at least one factor that influenced the generated risk score. If the ACS 512 is unavailable, the method also includes transmitting 1010 an authentication response message based on the RBA result data. In some embodiments, the authentication platform 614 generates an authentication decision based on the RBA result data and embeds the authentication decision in the authentication response message.

In the example embodiment, transactions are categorized "merchant only" or "fully authenticated." "Fully authenticated" transactions are generally considered to be low risk transactions that have been authenticated. "Merchant only" transactions are more risky transactions. In some embodiments, "merchant only" transactions have been authenticated. In the example embodiment, one or more indicators in the authentication response indicate whether a transaction is "merchant only" or "fully authenticated." One or more indicators may also indicate whether or not authentication was attempted on the transaction. This information is used by the merchant to determine whether or not to begin the authorization process for the transaction. In some embodiments, this information is also stored in the database 120 (shown in FIG. 2) and is referred to by at least one of the interchange network 28 and the issuer bank 30 during the authorization process 20 (all shown in FIG. 1).

In the example embodiment, the authentication platform 614 performs the authentication process on the transaction, including RBA. This analysis is based on a machine learning model where, over time, the authentication platform 614 is capable of improving its ability to determine the risk level associated with transactions. The authentication platform 614 analyzes transactions that are authenticated by the ACS 512 and compares these transactions with historical data to generate a risk model for each issuer bank 30. By comparing the data points in each transaction, the risk model will indicate the amount of risk associated with each transaction based on the authentication data in the corresponding authentication requests. This allows the authentication platform 614 to analyze transactions when the ACS 512 is unavailable and perform authentication on these transactions to provide a response to the authentication request. Accordingly, the authentication platform 614 may determine that a received authorization request is substantially similar to a previous transaction that the ACS 512 scored at low risk. Thus allowing the authentication platform 614 to determine that the received transaction is low risk with a degree of certainty.

In some embodiments, the authentication platform 614 determines whether or not the ACS 512 available by transmitting the authentication request message to the ACS 512. In these embodiments, the authentication platform 614 waits a predetermined period of time for a response from the ACS 512. The authentication platform 614 determines that the ACS 512 is unavailable if no response is received from the ACS 512 after the predetermined period of time. Alternatively, the authentication platform 614 may receive a response from the ACS 512 that indicates that the ACS 512 is unable to perform authentication. The response from the ACS 512 may indicate that the online user is not enrolled with the ACS 512, that the ACS 512 is currently unavailable, or that the ACS 512 was unable to authenticate the online user. This indication may be contained in the response message from the ACS 512. In other embodiments, the authentication platform 614 may transmit periodic status check messages to the ACS 512 to determine whether or not the ACS 512 is available.

In some embodiments, the authentication platform 614 determines that the online user is not associated with the ACS 512 based on the extracted authentication data. In these embodiments, the issuer associated with the online user has not registered with an ACS 512. In these embodiments, the authentication platform 614 generates an authentication decision based on the RBA result data.

In some further embodiments, the authentication platform 614 determines whether the authentication request message complies with the 3DS 2 Protocol or subsequent versions of the 3DS Protocol. If the authentication request message does not comply with the appropriate 3DS Protocols, the authentication platform 614 bypasses determining if the ACS 512 is available. In this situation, the authentication platform 614 transmits an authentication response message indicating that the transaction is considered merchant only and that no authentication was attempted.

In some embodiments, the authentication platform 614 determines a risk level based on the RBA result data. If the risk level is low, the authentication platform 614 embeds an indicator in the authentication response message indicating that the transaction is "fully authenticated." If the risk level is not low, the authentication platform 614 embeds one or more indicators in the authentication response message indicating that the transaction is a merchant only transaction and that authentication was attempted.

Figure 11A:
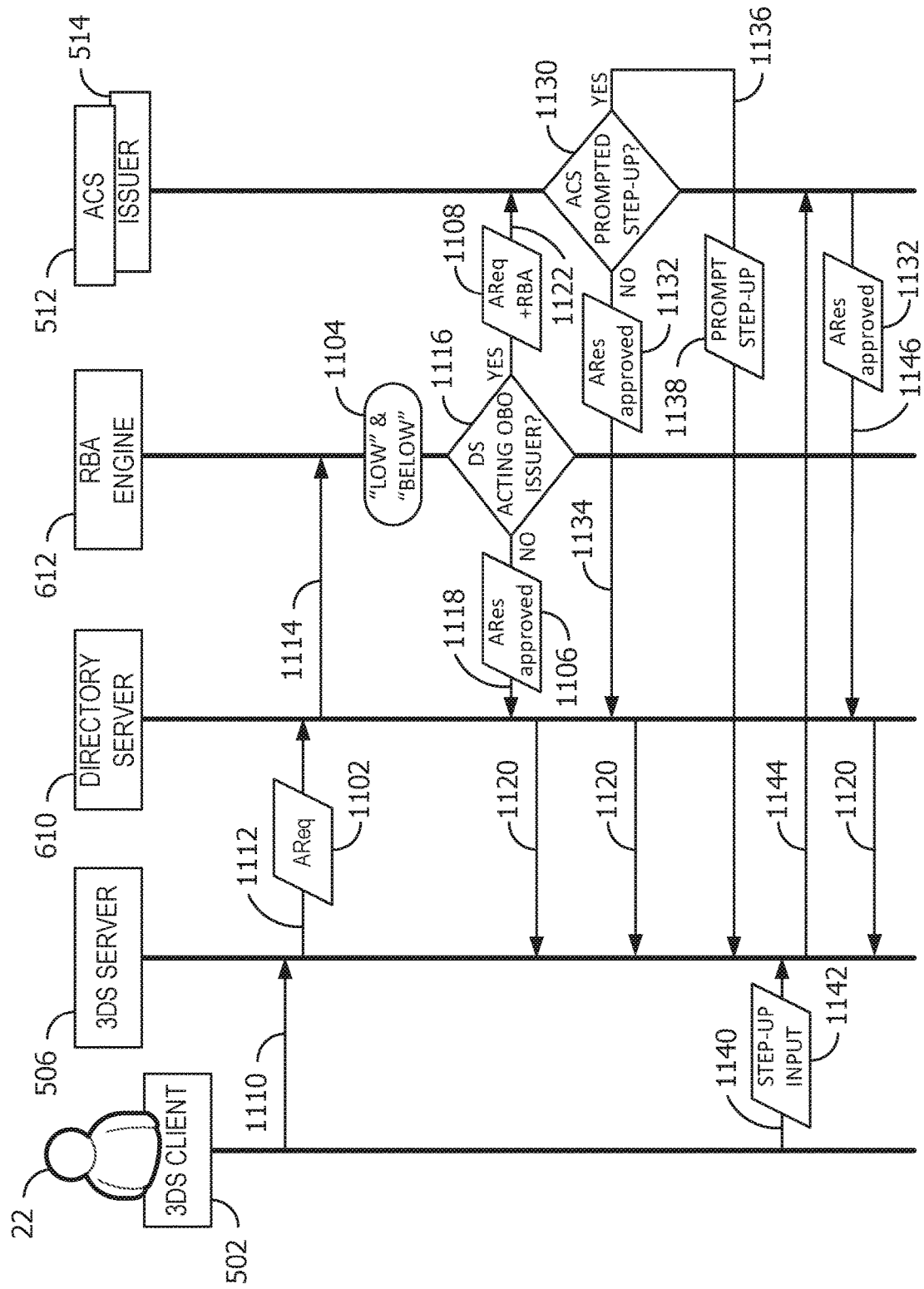
FIGS. 11A and 11B are swim-lane diagrams illustrating additional example embodiments involving conditional SCA evaluation on transactions associated with a regulated market.
Figure 11B:
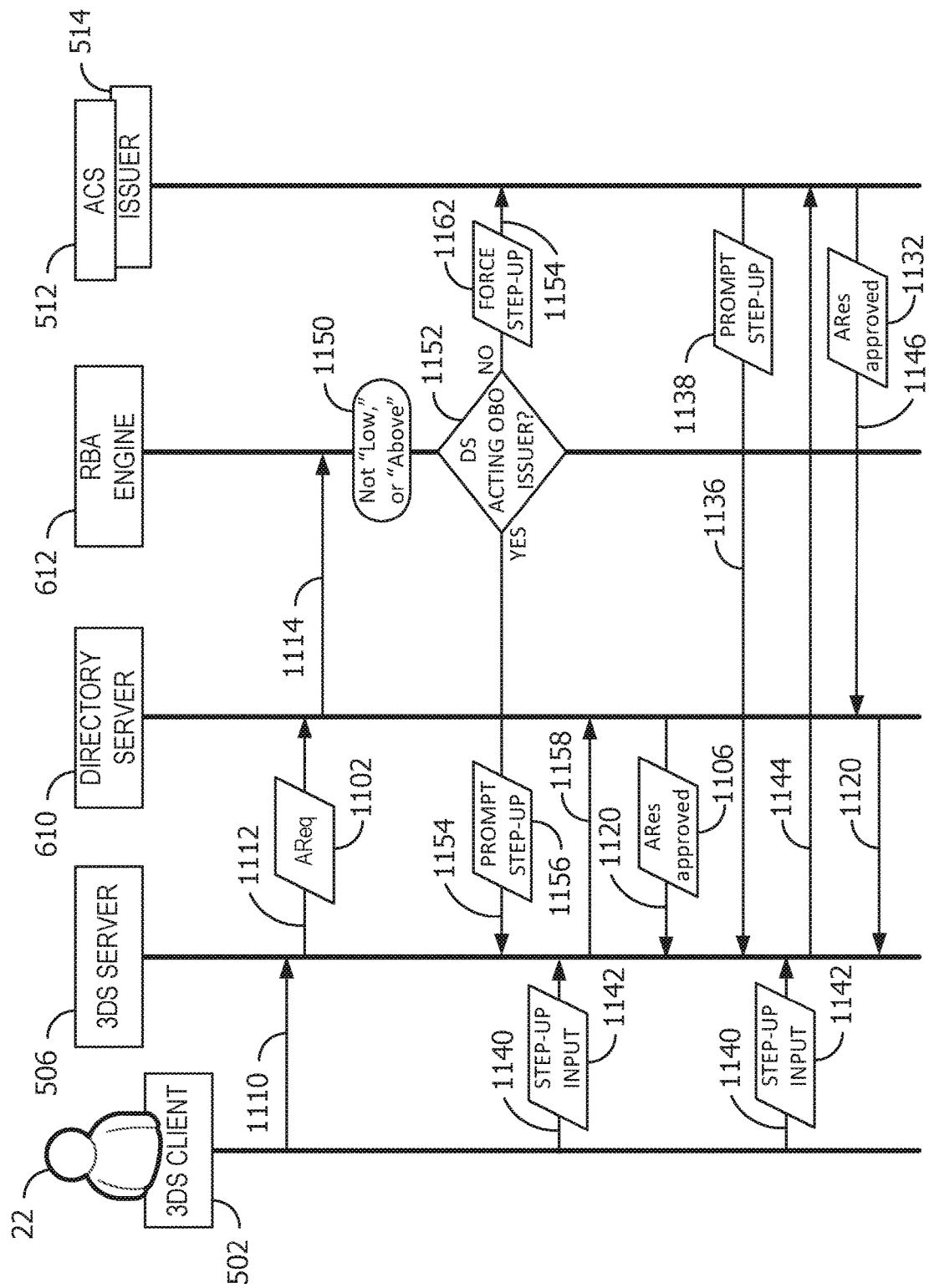

FIGS. 11A and 11B are swim-lane diagrams illustrating additional example embodiments involving conditional SCA evaluation on transactions associated with a regulated market. FIG. 11A is directed to transactions that are allowed to avoid regulator-imposed SCA step-up challenges when the transactions are determined to be of sufficiently low risk and low value. FIG. 11B is directed to transactions that are forced into SCA step-up challenges when the transactions are more risky or when the transactions are of higher value. In such scenarios, any of the above-described systems and methods involving the RBA-enabled directory server (or just "directory server") 610 and RBA engine 612 may be employed in conjunction with conditional SCA, subject to the restrictions imposed by regulators as described herein.

Referring now to FIG. 11A, in this example embodiment, at step 1110, the cardholder 22 initiates an online transaction with a merchant, represented here by 3DS server 506, via their computing device, represented here by 3DS client 502. 3DS server 506 generates and transmits an AReq message 1102 to directory server 610 at step 1112 and extracts transaction data from AReq message (e.g., as described above with respect to FIG. 6). AReq message 1102 includes a transaction value for the transaction, as well as other authentication data associated with the transaction (e.g., as a 3DS AReq message). Directory server 610 receives AReq message 1102 and determines that the transaction involves a market regulated by a regulatory entity, such as a central bank of a particular country associated with the transaction (e.g., based on the identity or location of cardholder 22, merchant 24, merchant bank 26, or issuer bank 30).

Transactions in some regulated markets may be subject to forced SCA for all transactions. In the example embodiment, the regulated market for this example transaction has opted into conditional SCA as described herein. In such markets, regulators may generally mandate SCA on transactions, but may allow transactions to be authenticated without SCA in particular circumstances. As such, directory server 610 identifies a transaction limit and a risk threshold for conditional SCA of that particular regulated market. The transaction limit represents a threshold transaction value below which SCA may be avoided if the risk threshold is also satisfied. The risk threshold represents a level of risk of fraud associated with the transaction (e.g., as determined, or "scored," by RBA engine 612). In other words, and for example, if the risk level of the transaction is "low" (e.g., below a risk score threshold) and the transaction is a "low-value" transaction (e.g., below the transaction threshold value), then SCA may not be mandated by the regulated entity. If the transaction value is not a low-value transaction (e.g., at or above the transaction threshold value) or if the transaction is not a low-risk transaction (e.g., at or above a risk score threshold), then SCA may be mandated by the regulated entity.

Directory server 610 compares the transaction value to the transaction limit set by the regulatory entity and, in this example, determines that the transaction value is less than the transaction limit (e.g., the transaction is a "low-value" transaction). As such, directory server 610 engages RBA engine 612 at step 1114 to evaluate risk associated with AReq. RBA engine 612 evaluates risk associated with the transaction using the authentication data and other transaction data associated with AReq, as described above. RBA engine 612 generates risk-based authentication result data that includes a risk score for the transaction.

In this example, RBA engine 612 compares the risk score generated for this transaction to the risk threshold identified for this regulated market and determines that the risk of fraud in this transaction is below the risk threshold. In some embodiments, the risk score and the risk threshold may be integer values that may be compared to determine whether the risk score is more or less than the risk threshold. In other embodiments, the risk threshold may be a category of a tiered set of categories (e.g., "low", "medium", "high") and the risk score may be of that same tiered set of categories, or the risk score may be a value that is mapped into that tiered set of categories (e.g., with regulator-, issuer-, or system-defined ranges for each category). For example, RBA engine 612 may allow the regulators for this market to define the "low risk" category as being any transaction score below 400 (e.g., as evaluated under 3DS 2 by RBA engine 612).

Continuing this example, RBA engine 612 has determined, at step 1104, that the transaction is both "low" and "below." In other words, the transaction is both a low-value transaction as well as below the regulator's transaction threshold. As such, as far as the regulator is concerned, the transaction is not mandated to have SCA performed. However, some issuers may have more stringent requirements for SCA step-up, or may have other reasons for rejecting authentication regardless of SCA step-up considerations. For example, some issuers may reject any CNP transaction evaluating to a "high" risk. For ease of description, such flow and rejections are not expressly illustrated in FIGS. 11A and 11B. Rather, FIGS. 11A and 11B focus on scenarios involving when SCA is mandated or allowed to be avoided.

In some scenarios, the authentication platform (e.g., directory server 610 and RBA engine 612) may be entrusted to perform authentication processing on behalf of issuer 514. In other scenarios, authentication may be performed by ACS 512. As such, at test 1116, if the authentication platform is acting on behalf of issuer 514 for authentication, then RBA engine 612 generates an ARes message 1106 approving the transaction at step 1118 (presuming no other reason for authentication rejection) and transmits ARes 1106 to 3DS server 506 at step 1120 without having performed SCA step-up authentication on consumer 22.

If, at test 1116, the authentication platform does not perform authentication on behalf of issuer 514 (e.g., issuer 514 has ACS 512 perform authentication services), then RBA engine 612 transmits an enhanced AReq message 1108 to ACS 512 at step 1122. Enhanced AReq may include, in addition to the additional RBA data described above associated with 3DS 2, a data field indicating that SCA step-up is not mandated by the involved market(s) for this transaction. However, issuer 514 or ACS 512 may otherwise determine to perform SCA on the transaction (e.g., if preferred by the issuer for certain types of transactions or other considerations). If, at test 1130, ACS 512 does not prompt SCA step-up, then ACS 512 returns an ARes message 1132 to the authentication platform at step 1134 approving authentication of the transaction.

If, at test 1130, ACS 512 determines to prompt SCA step-up, then ACS 512 prompts step-up 1138 via 3DS server 506 (or 3DS client 502) at step 1136. Consumer 22 provides step-up input 1142 back to 3DS server 506 (or directly to ACS 512) and, upon successful step-up, ACS 512 transmits the ARes message 1132 to the authentication service at step 1146.

Referring now to FIG. 11B, in this example, the authentication platform determines that the transaction does not meet the requirements to avoid SCA step-up and, as such, SCA step-up is mandated. In the example embodiment, RBA engine 612 determines, at step 1150, that either the transaction value is above the transaction limit set by the regulatory entity, or that the transaction risk does not satisfy the risk threshold set by the regulatory entity, or both. If, at test 1152, the authentication platform is acting on behalf of issuer 514, and presuming no other reason for denying authentication of the transaction, RBA engine 612 prompts step-up 1156 of consumer 22 at step 1154. Consumer 22 responds with step-up input 1142 at step 1140, either directly with directory server 610 or via 3DS server 506 at step 1158 and, upon successful step-up challenge, 3DS server 506 transmits ARes message 1106 to 3DS server 506 approving authentication of the transaction.

If, at test 1152, ACS 512 is acting on behalf of issuer 514, RBA engine 612 transmits, at step 1154, the enhanced AReq 1108 (represented here by 1162) along with an indication to force SCA step-up challenge of consumer 22 for this transaction. Enhanced AReq may include, in addition to the additional RBA data described above associated with 3DS 2, a data field mandating ACS 512 to perform SCA step-up for the transaction (e.g., if the transaction is otherwise deemed to be approved for authentication by ACS 512). In other words, AReq 1108 serves to inform ACS 512 that the transaction may not be authenticated without SCA. Presuming no other reason to reject authentication of the transaction, ACS 512 identifies that the transaction is subject to a mandated SCA step-up and prompts step-up 1138 in steps 1136, 1140, 1144, and transmits ARes 1132 approving the transaction in steps 1146 and 1120, as described above.

In some embodiments, the authentication platform provides a graphical user interface (GUI) dashboard (not shown) for use by the regulators. The GUI may, for example, allow the regulators to view and evaluate fraud data associated with their market. For example, in one embodiment, the GUI dashboard may be configured to display historical fraud data indicating a level of fraud present in transactions not mandated to be authenticated with SCA by RBA engine 612 when satisfying the risk threshold and transaction limit set by the regulatory entity (e.g., a percentage of "frictionless transactions" within RBA, perhaps including approval rates or basis points of fraud). In one embodiment, the GUI dashboard may be configured to display historical fraud data indicating a level of fraud present in transactions mandated to be authenticated with SCA by the RBA engine 612 when not satisfying one or more of the risk threshold or transaction limit (e.g., percentage of transactions stepped-up within RBA, perhaps with the type of step-up, approval rates, basis points of fraud). Such data may include an electronic gross dollar value (eGDV), an eTransaction count, or growth over time for such metrics. Such data may also be presented by channel. For example, such data may be limited to mobile device transactions, browser-based transactions, telephone transactions, and mail transactions. As such, the GUI may allow the regulators to determine how their current settings are impacting fraud in these types of transactions.

In some embodiments, the GUI allows the regulators to adjust conditional SCA settings associated with their market. For example, the GUI may allow the regulators to alter the risk threshold required to avoid SCA, or to alter the transaction limit for transactions that can avoid SCA. In some embodiments, the GUI provides simulation analysis of prospective changes to the conditional SCA settings. For example, using historical data, the GUI may provide a fraud impact analysis to a proposed higher risk threshold, or to a proposed higher transaction limit, perhaps estimating a predicted level of fraud at the proposed settings. As such, the GUI may allow the regulators to determine potential impacts or potential results based on prospective changes.

Figure 12:
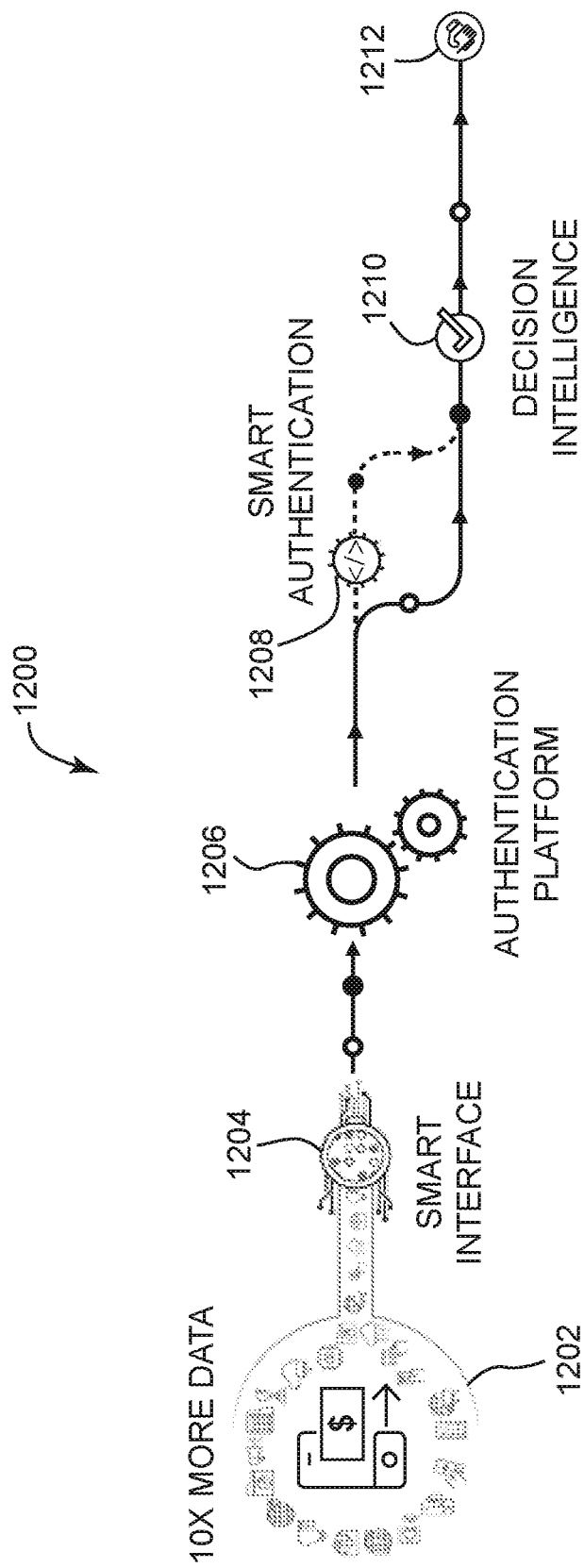

FIG. 12 is a flow diagram of an advanced authentication process 1200 for increasing approvals, reducing fraud, and improving consumer experience. Authentication process 1200 may be implemented, for example, using the systems and methods described herein. As shown in FIG. 12, authentication data 1202 is transmitted to an authentication platform 1206 (such as authentication platform 614) through a smart interface 1204. As described above, as compared to previous authentication methods (e.g., 3DS 1.0), authentication data 1202 under the 3DS 2 Protocol (and subsequent versions of the 3DS Protocol) includes approximately ten times the amount of transaction data to be gathered, analyzed, and utilized to prevent fraud. Using authentication data 1202, authentication platform 1206 performs smart authentication 1208 (as described herein) to generate RBA results data. Decision intelligence (DI) 1210 uses other sources of data (i.e., a separate model) to influence authorization decisions. In some embodiments, the RBA results data may be incorporated into DI 1210. These assessments enable an interested party 1212 (e.g., the ACS, the merchant, and/or the issuer) to complete authentication (and authentication) of the transaction.

Authentication process 1200 enables authenticating an online user as a legitimate user of a payment account without having to ask additional questions of the user (e.g., as part of a step-up challenge) or having to request additional inputs from the user. Thus, authentication process 1200 assesses a risk of fraud without creating any additional friction for the user that may cause the user to terminate a transaction.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing transaction and authentication data, and detecting and analyzing risk.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for authenticating an online user with an access control server (ACS), the method comprising:
    receiving, at a risk-based authentication enabled (RBA-enabled) directory server, an authentication request message, the authentication request message including authentication data, the RBA-enabled directory server including a processor in communication with a memory device;
    extracting, using the RBA-enabled directory server, the authentication data from the authentication request message;
    transmitting the extracted authentication data to an RBA engine, wherein the RBA-enabled directory server and the RBA engine are operated by a payment processing network;
    generating, using the RBA engine, based at least in part on the extracted authentication data, RBA result data including a risk score, a risk analysis, and at least one reason code, the RBA result data generated by performing RBA using the extracted authentication data and a database of historical transaction data for all transactions previously processed by the payment processing network, the RBA engine having access to the historical data for all transactions previously processed by the payment processing network, and the ACS only having access to transaction data for a smaller number of transactions than all transactions previously processed by the payment processing network, wherein generating the RBA result data comprises:
        establishing, using the RBA engine, a plurality of reason code categories, each reason code category including a plurality of anchors, wherein the plurality of reason code categories include at least a cardholder category, a merchant category, and an environment category;
        activating, using the RBA engine, based on a comparison of the extracted authentication data to at least one long term variable stored in the database, a plurality of activated anchors, wherein at least one of the plurality of activated anchors is in the cardholder category or the merchant category; and
        generating, using the RBA engine, the at least one reason code based on connections between the plurality of activated anchors by:
            when at least one anchor in the cardholder category is activated, generating a positive reason code indicating a low risk of fraud;
            when at least one anchor in the cardholder category is activated and at least one anchor in the merchant category is activated, generating a stronger positive reason code indicating a lower risk of fraud; and
            when at least one anchor in the cardholder category is activated, at least one anchor in the merchant category is activated, and at least one anchor in the environment category is activated, generating an even stronger positive reason code indicating an even lower risk of fraud;
    transmitting the RBA result data to the RBA-enabled directory server;
    embedding, using the RBA-enabled directory server, the RBA result data into the authentication request message to generate an enhanced authentication request message, wherein embedding the RBA result data comprises appending the risk score, the risk analysis, and the at least one reason code to the authentication request message as an extensible markup language (XML) extension such that the enhanced authentication request message includes the risk score, the risk analysis, and the at least one reason code generated by the RBA engine; and
    transmitting the enhanced authentication request message to the ACS to enable the ACS to make an authentication decision based on the RBA result data.

2. The method of claim 1, further comprising receiving, at the RBA-enabled directory server, an authentication response message from the ACS, the authentication response message including the authentication decision.

3. The method of claim 1, wherein generating RBA result data comprises comparing the authentication data to the at least one long term variable and at least one short term variable.

4. The method of claim 3, wherein the at least one long term variable includes historical authentication data and historical authorization data.

5. The method of claim 1, wherein receiving an authentication request message comprises receiving an authentication request message complying with 3DS 2 Protocol or subsequent 3DS Protocol versions.

6. An authentication platform for authenticating an online user with an access control server (ACS), the authentication platform comprising:
a memory device; and
at least one processor coupled to the memory device, the at least one processor configured to:
receive an authentication request message, the authentication request message including authentication data;
extract the authentication data from the authentication request message;
generate, based at least in part on the extracted authentication data, risk-based authentication (RBA) result data including a risk score, a risk analysis, and at least one reason code, the RBA result data generated by an RBA engine by performing RBA using the extracted authentication data and a database of historical transaction data for all transactions previously processed by a payment processing network, the RBA engine operated by the payment processing network and having access to the historical data for all transactions previously processed by the payment processing network, and the ACS only having access to transaction data for a smaller number of transactions than all transactions previously processed by the payment processing network, wherein the at least one processor is configured to generate the RBA result data by:
establishing a plurality of reason code categories, each reason code category including a plurality of anchors, wherein the plurality of reason code categories include at least a cardholder category, a merchant category, and an environment category;
activating, based on a comparison of the extracted authentication data to at least one long term variable stored in the database, a plurality of activated anchors, wherein at least one of the plurality of activated anchors is in the cardholder category or the merchant category; and
generating the at least one reason code based on the connections between the plurality of activated anchors by:
when at least one anchor in the cardholder category is activated, generating a positive reason code indicating a low risk of fraud;
when at least one anchor in the cardholder category is activated and at least one anchor in the merchant category is activated, generating a stronger positive reason code indicating a lower risk of fraud; and
when at least one anchor in the cardholder category is activated, at least one anchor in the merchant category is activated, and at least one anchor in the environment category is activated, generating an even stronger positive reason code indicating an even lower risk of fraud;
embed the RBA result data into the authentication request message to generate an enhanced authentication request message, wherein to embed the RBA result data, the at least one processor is configured to append the risk score, the risk analysis, and the at least one reason code to the authentication request message as an extensible markup language (XML) extension such that the enhanced authentication request message includes the risk score, the risk analysis, and the at least one reason code generated by the RBA engine; and
transmit the enhanced authentication request message to the ACS to enable the ACS to make an authentication decision based on the RBA result data.

7. The authentication platform of claim 6, wherein the at least one processor is further configured to receive an authentication response message from the ACS, the authentication response message including the authentication decision.

8. The authentication platform of claim 6, wherein to generate RBA result data, the at least one processor is configured to compare the authentication data to the at least one long term variable and at least one short term variable.

9. The authentication platform of claim 8, wherein the at least one long term variable includes historical authentication data and historical authorization data.

10. The authentication platform of claim 6, wherein to receive an authentication request message comprises, the at least one processor is configured to receive an authentication request message complying with 3DS 2 Protocol or subsequent 3DS Protocol versions.

11. At least one non-transitory computer-readable storage media having computer-executable instructions embodied thereon for authenticating an online user on behalf of an access control server (ACS), wherein when executed by at least one processor, the computer-executable instructions cause the at least one processor to:
receive an authentication request message, the authentication request message including authentication data;
extract the authentication data from the authentication request message;
generate, based at least in part on the extracted authentication data, risk-based authentication (RBA) result data including a risk score, a risk analysis, and at least one reason code, the RBA result data generated by an RBA engine by performing RBA using the extracted authentication data and a database of historical transaction data for all transactions previously processed by a payment processing network, the RBA engine operated by the payment processing network and having access to the historical data for all transactions previously processed by the payment processing network, and the ACS only having access to transaction data for a smaller number of transactions than all transactions previously processed by the payment processing network, wherein the computer-executable instructions cause the at least one processor to generate the RBA result data by:
establishing a plurality of reason code categories, each reason code category including a plurality of anchors, wherein the plurality of reason code categories include at least a cardholder category, a merchant category, and an environment category;
activating, based on a comparison of the extracted authentication data to at least one long term variable stored in the database, a plurality of activated anchors, wherein at least one of the plurality of activated anchors is in the cardholder category or the merchant category; and
generating the at least one reason code based on the connections between the plurality of activated anchors by:
when at least one anchor in the cardholder category is activated, generating a positive reason code indicating a low risk of fraud;
when at least one anchor in the cardholder category is activated and at least one anchor in the merchant category is activated, generating a stronger positive reason code indicating a lower risk of fraud; and when at least one anchor in the cardholder category is activated, at least one anchor in the merchant category is activated, and at least one anchor in the environment category is activated, generating an even stronger positive reason code indicating an even lower risk of fraud;

embed the RBA result data into the authentication request message to generate an enhanced authentication request message, wherein to embed the RBA result data, the instructions cause the at least one processor to append the risk score, the risk analysis, and the at least one reason code to the authentication request message as an extensible markup language (XML) extension such that the enhanced authentication request message includes the risk score, the risk analysis, and the at least one reason code generated by the RBA engine; and transmit the enhanced authentication request message to the ACS to enable the ACS to make an authentication decision based on the RBA result data.

12. The computer-readable storage media of claim 11, wherein the computer-executable instructions further cause the at least one processor to receive an authentication response message from the ACS, the authentication response message including the authentication decision.

13. The computer-readable storage media of claim 11, wherein to embed the RBA result data, the computer-executable instructions cause the at least one processor to compare the authentication data to the at least one long term variable and at least one short term variable.

14. The computer-readable storage media of claim 13, wherein the at least one long term variable includes historical authentication data and historical authorization data.

* * * * *